United States Patent [19]

Guttag et al.

[11] Patent Number: 5,398,316

[45] Date of Patent: Mar. 14, 1995

[54] DEVICES, SYSTEMS AND METHODS FOR ACCESSING DATA USING A PIXEL PREFERRED DATA ORGANIZATION

[75] Inventors: Karl M. Guttag, Missouri City, Tex.; Richard D. Simpson, Bedford, Great Britain; Robert J. Gove, Plano, Tex.

[73] Assignee: Texas Instruments Incorporated, Dallas, Tex.

[21] Appl. No.: 17,566

[22] Filed: Feb. 16, 1993

[51] Int. Cl.[6] .............................................. G06F 15/62
[52] U.S. Cl. ..................................... 395/164; 395/166
[58] Field of Search ............... 395/162, 163, 166, 164; 345/185, 186, 187, 188, 189, 190, 191, 201, 203

[56] References Cited

U.S. PATENT DOCUMENTS

| | | | |
|---|---|---|---|
| 4,562,435 | 12/1985 | McDonough et al. | 340/798 |
| 4,639,890 | 1/1987 | Heilveil et al. | 364/900 |
| 4,667,313 | 5/1987 | Pinkham et al. | 365/240 |
| 4,807,189 | 2/1989 | Pinkham et al. | 365/189 |
| 4,827,249 | 5/1989 | Chauvel et al. | 340/721 |
| 4,935,730 | 6/1990 | Kosuka | 340/723 |
| 4,985,848 | 1/1991 | Pfeiffer et al. | 395/164 |
| 5,293,468 | 3/1994 | Nye et al. | 395/162 |

OTHER PUBLICATIONS

Sartore, Ron, "Seeking a Wide Berth", *In Depth* Magazine Nov., 1989, pp. 307-310 and 312-318.

R. F. Sproull, et al., "The 8 by 8 Display", *ACM Transactions on Graphics* vol. 2, No. 1, Jan. 1983, pp. 32-56.

Satish Gupta, "Architecture and Algorithms for Parallel Updates of Raster Scan Displays", Dec. 1981, Dept. of Computer Science Carnegie Mellon Univ. pp. 1-168.

*Primary Examiner*—Mark R. Powell
*Assistant Examiner*—U. Chauhan
*Attorney, Agent, or Firm*—Robert D. Marshall, Jr.; James C. Kesterson; Richard L. Donaldson

[57] ABSTRACT

A processing system operating on data words having first and second portions includes a memory bank comprising first and second memories each with associated first and second set of address inputs. First memory includes a first storage location storing the first portion of a first word accessible by a set of address bits received at the first inputs and a second set of address bits received at the second inputs. The first memory further includes a second storage location storing the second portion of a second word accessible by the first set of bits received at the first inputs and a third set of bits received at the second inputs. Second memory includes a first storage location storing the second portion of the second word accessible by the first set of bits received at the first inputs and the second set of bits received at the second inputs. Second memory has a second storage location storing the first portion of the second word accessible by the first inputs and the third set of bits received at the second inputs. Processing system includes a processor operating in a first mode to access a selected one of the first and second words and in a second mode to access a selected one of the first and second portions of both the first and second words.

39 Claims, 10 Drawing Sheets

DEVICES, SYSTEMS AND METHODS FOR ACCESSING DATA USING A PIXEL PREFERRED DATA ORGANIZATION

NOTICE (C) Copyright, *M* Texas Instruments Incorporated, 1990. A portion of the Disclosure of this patent document contains material which is subject to copyright protection. The copyright and mask work owner has no objection to facsimile reproduction by anyone of the patent document or the patent disclosure, as it appears in the U.S. Patent and Trademark Office, patent file or records, but otherwise reserves all rights in its copyright and mask work whatsoever.

CROSS-REFERENCE TO RELATED APPLICATIONS

The following coassigned applications are hereby incorporated herein by reference:

U.S. patent application Ser. No. 08/135,754 filed Oct. 12, 1993, a continuation of U.S. patent application Ser. No. 07/933,865 filed Aug. 21, 1992 now abandoned, a continuation of U.S. patent application Ser. No. 07/435,591, filed Nov. 17, 1989 now abandoned entitled "Multiple Processor and Crossbar Link of Processors and Memories", U.S. Pat. No. 5,233,690, entitled "Video Graphics Display Memory Swizzle Logic And Expansion Circuit And Method", filed Jul. 28, 1989;

U.S. Pat. No. 5,269 001 entitled "Video Graphics Display Memory Swizzle Logic And Expansion Circuit And Method", filed Jul. 28, 1989; and U.S. Pat. No. 5,287/470, entitled "Processor System Supporting Block-Write Function into Interleaved Memory Banks", filed Dec. 28, 1989; and U.S. patent application Ser. No. 08/018,487 entitled "Devices, Systems and Methods for Accessing Data Using a Pixel Preferred Data Organization", filed Feb. 16, 1993.

TECHNICAL FIELD OF THE INVENTION

The present invention relates in general to digital processing and in particular to devices, systems and methods for accessing data using a pixel prefered data organization.

BACKGROUND OF THE INVENTION

A typical graphics processing system includes a frame buffer which holds bit-mapped data generated by the graphics processor which corresponds to the pixels of a frame of an image to be displayed. The pixel data stored in the frame buffer is then available for either processing, such as filtering, by the graphics system processor or for output to the backend circuitry driving the system display device.

Contemporary frame buffers are usually constructed using video random access memory devices (VRAMs) which include an address port, a random access data port for communicating with the graphics processor, and a serial port for communicating with the display driver circuitry. The storage elements of the VRAMs are typically arranged in rows and columns such that the pixel data can be stored in a manner which organizationally corresponds to the lines (rows and columns) of pixels on the display. Further, the VRAMs usually are organized in multiple planes with the same location in each plane accessed with a single address such that multiple bit words can be transferred to and from that location in a single address cycle.

In one graphics system data format, a pixel is defined in terms of red, green, and blue color data and a blending factor alpha. For example, in a 32-bit system a given pixel may be defined by a 32-bit words composed of 8-bits each of red, green, blue, and for example alpha data. In the frame buffer, the 32-bit word of pixel data or simply "pixel" may be stored across thirty-two planes of one or more parallel VRAMs for access with a single address through the random port.

During data processing it may not always be desirable to access a whole pixel for a given operation. For instance, it may be advantageous to perform filtering on only one particular portion of the data defining an image in the frame buffer, such as the red data. At the same time, for other operations it still may be desirable to access "whole" pixels or red, green, blue and alpha color data. This requirement that during some operations whole pixels be accessible and during other operations only portions of pixels be accessible can severely burden system operation, for example, by requiring unnecessary addressing/access operations.

Thus, the need has arisen for devices, systems and methods which allow for efficient access of either whole data words or portions of data words stored in a memory as required by a given data processing operation.

SUMMARY OF THE INVENTION

According to the invention, a processing system is provided operating on data words each having at least first and second portions. The processing system includes a memory bank having first and second memories each associated with first and second address inputs. The first memory includes a first storage location for storing the first portion of a first word and is accessible by a first set of address bits being received at the first inputs associated with the first memory and a second set of inputs address bits received at the second inputs associated with the first memory. The first memory also includes a second storage location for storing the second portion of a second word and is accessible by the first set of bits being received at the first inputs associated with the first memory and a third set of bits being received at the second inputs associated with the first memory. The second memory includes a first storage location for storing the second portion of the second word and is accessible by the first set of bits being received at the first inputs associated with the second memory and the second set of bits being received at the second set of inputs associated with the second memory. The second memory also includes a second storage location for storing the first portion of the second word and is accessible by the first set of bits being received at the first inputs associated with the second memory and the third set of bits being received at the second set of inputs associated with the second memory. The processing system includes a processor which is operable in a first mode to access a selected one of the first and second words by providing a corresponding first set of address bits to the first inputs associated with each of the first and second memories and a corresponding one of the second and third sets of bits to the second inputs associated with each of the first and second memories. The processor is operable in a second mode to access a selected one of the first and second portions of both the first and second words by providing a corresponding first set of bits to the first inputs associated with each of the first and second memories, providing a selected one of the second and third sets of bits to the second inputs associated with the first memory and providing an other one of the second and third sets of bits to the second inputs associated with the second memory.

The embodiments of the present invention allow for the efficient access of either whole data words or portions of data words stored in the memory as required by given data processing operation. In particular embodiments, the present invention provides for the access of either or whole words of pixel data or specific gun portions thereof as required by a given graphics processing operation.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF PREFERRED EMBODIMENTS

The preferred embodiment of the present invention and its advantages are best understood by referring to FIGS. 1-19 of the drawings, like numerals being used for like and corresponding parts of the various drawings.

Figure 1:
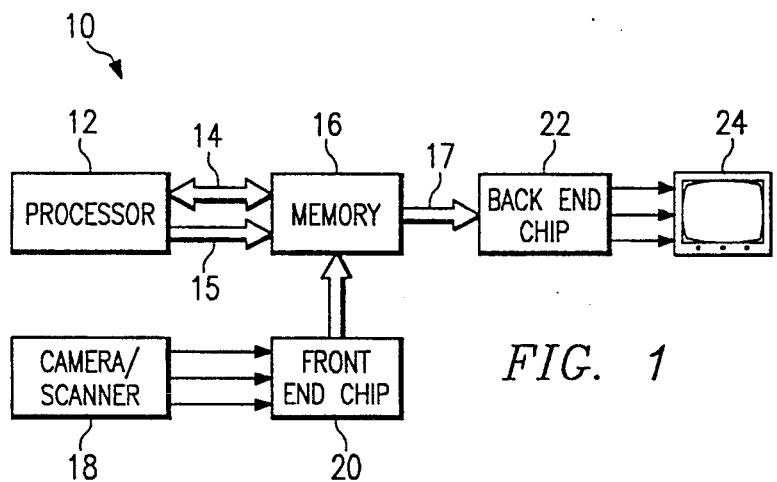
FIG. 1 is a functional block diagram of an imaging system.

FIG. 1 generally depicts a imaging system 10 which includes a processor 12 connected via a bidirectional data bus 14 and an address bus 15 to a memory 16. Processor 12 is preferably an image system processor (ISP) such as that described in copending and coassigned application Ser. No. 08/135,754, incorporated herein by reference.

A camera or scanner 18 provides a sensor coupled to a front end chip or circuit 20. Front end chip 20 is coupled to memory 16 to provide incoming sensor information thereto. Sensor 18 is in general any sensor capable of providing information that represents or is convertible into a vector or matrix of information such as an image. For instance sensor 18 can be an optical sensor in visible, infrared or ultraviolet range. In volume commercial systems sensor 18 may be a CCD (charge coupled device) sensor or a video camera. Alternatively, sensor 18 may be an antenna for receiving image data transmitted in the radio portion of the electromagnetic spectrum. X-ray, gamma ray, or other particle sensors are also alternatives in the electromagnetic realm. Ultrasonic sensors, nuclear magnetic resonance (NMR) imagers and photomultipliers in medical and other scientific applications are still further alternatives.

The memory 16 supplies output through bus 17 to a back end chip or circuit 22 such as a color palette which feeds control signals for driving a video monitor 24. Monitor 24 is representative of a variety of display means such as raster scan and other CRT(cathode ray tube) video displays, LCD (liquid crystal display) devices, laser printers and other printer devices, photographgenerating devices, and other image display devices.

Figure 2:
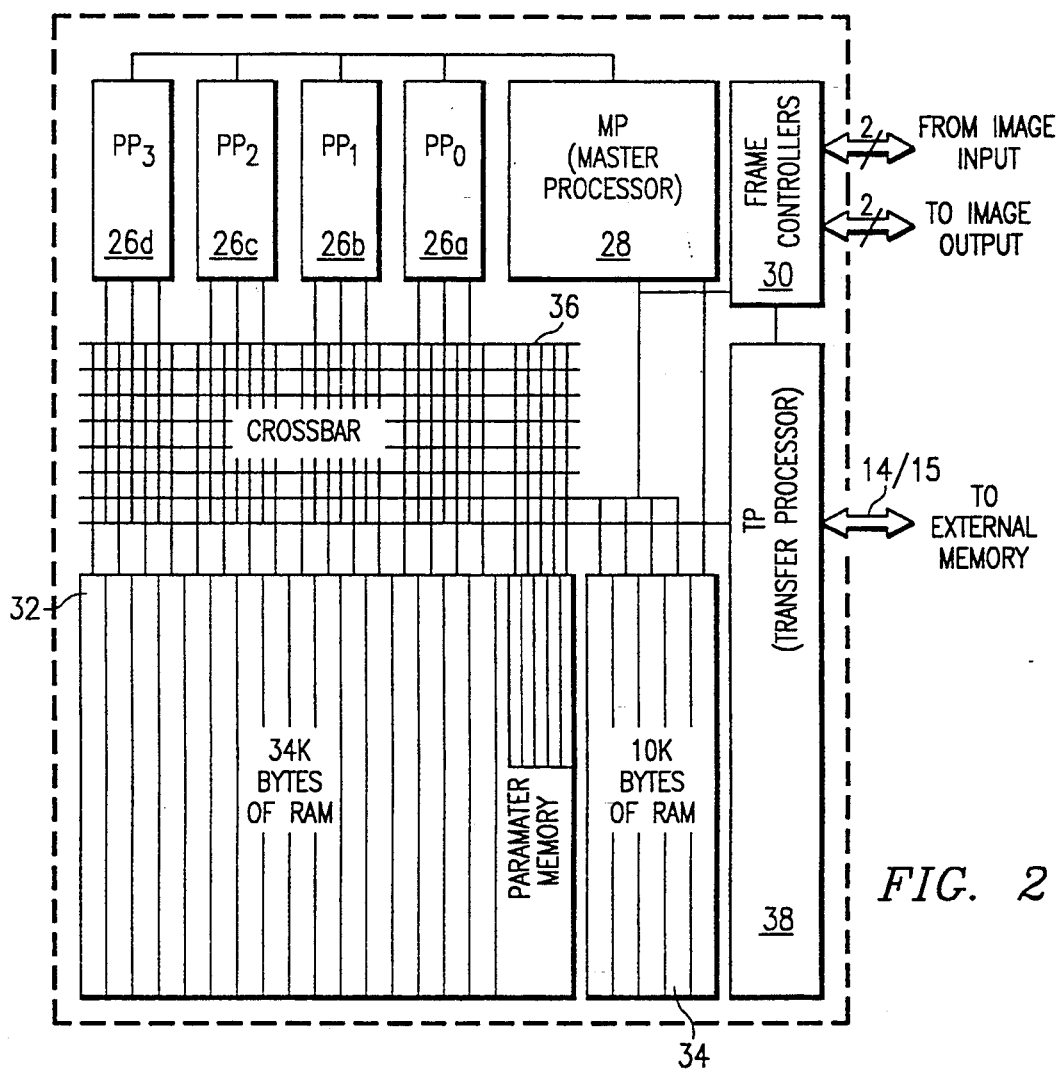
FIG. 2 is a functional block diagram of one embodiment of the image signal processor shown in FIG. 1.
Figure 3:
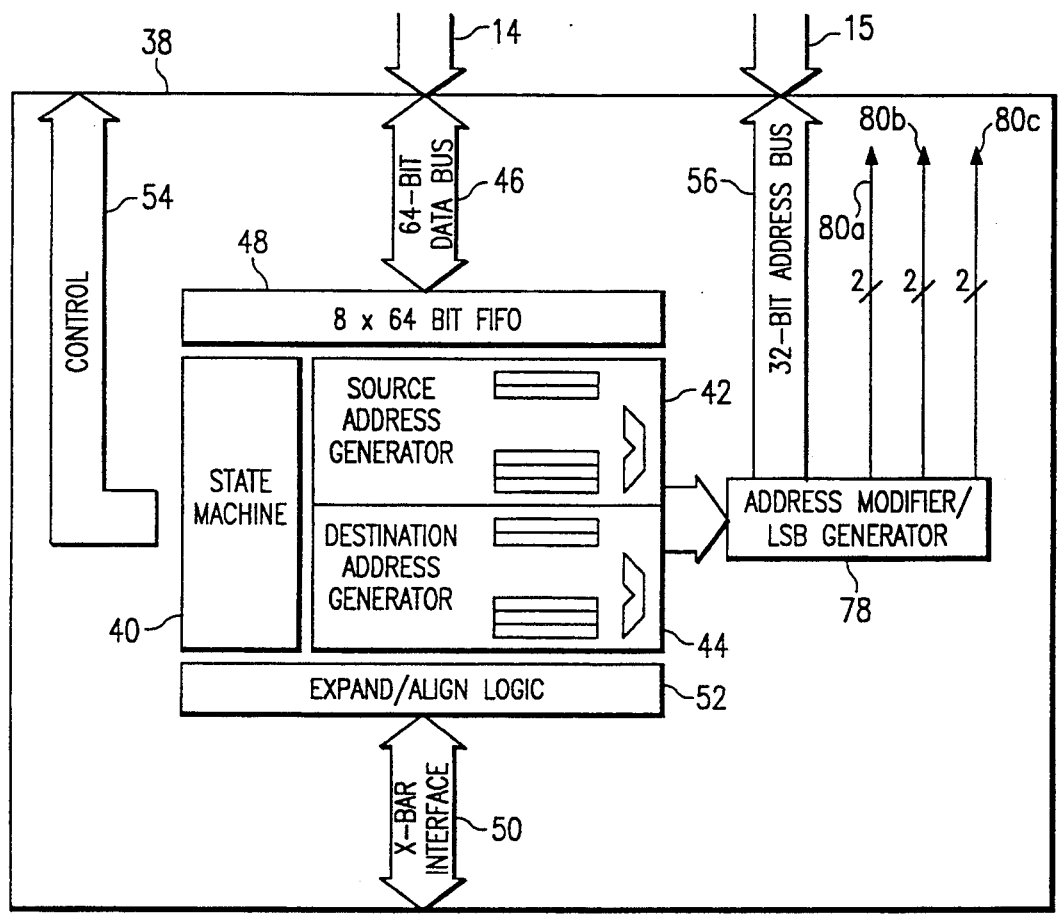
FIG. 3 is a functional block diagram of one embodiment of the transfer processor shown in FIG. 2.

FIG. 2 is a functional block diagram of an embodiment of ISP 12. Processor 12 includes a plurality of parallel processors 26a-26d, a master processor 28, frame controllers 30, memory 32, data/instruction cache 34, and crossbar switch 36. A complete description of each of these functional blocks in a preferred embodiment of ISP 12 is provided in copending and coassigned application Ser. No. 08/135,754, incorporated herein by reference. Of importance to the present discussion is transfer processor 38, which is depicted in further detail in FIG. 3. Transfer processor 38, includes state machine control circuitry 40, a source address generator 42, a destination address generator 44, an interface 46 with data bus 14 via first-in/first-out circuitry 48, an interface 50 with crossbar switch 36 through expand/align logic 52, an interface 54 with frame controllers 30, and an interface 56 with address bus 15. A description of these blocks is also provided for a preferred embodiment of ISP 12 in co-pending application Ser. No. 07/435,591. The improvements to transfer processor described below also include the addition of an address modifier.

Processor 12 as an ISP chip has a memory organization which efficiently utilizes the memory-to-processor bus 14 bandwidth, and displays a color image in real-time. Bus 14 in the illustrated embodiment is a 64-bit data bus and bus 15 a 32-bit address bus. With a 64-bit bus 14, several types of memory accesses should be available for selection on any memory cycle: A) two 32-bit pixels, B) eight 8-bit "guns" or C) sixty-four 1-bit controls (block write). Selection (C) supplies a number N of bits from memory equal in number to the bus width W (e.g. 64).

In general, selection (A) accesses N number of whole pixels where N is equal to the bit width W of bus 14 divided by the number of bits per pixels P (i.e. N=W/P). Selection (B) in general accesses a particular part ("gun") of several pixels at a time. The number of pixel parts or "guns" X accessed is equal to the bit width W of bus 14 divided by the number of bits B in each pixel part or gun (i.e. X=W/B). In the illustrated example where the bus width is sixty-four bits, eight 8-bit guns can be selected per memory cycle. In color imaging, the parts of pixels (guns) are associated with the color guns for red, green, and blue. A blending factor designated "alpha" is used to relate the pixel parts of a frame to construct an image that blends the pixel parts in the manner of a weighted average. By analogy, alpha is called a gun, even though there is no physical gun in a color picture tube which receives the alpha information.

For color video purposes, the information content of each pixel held in the memory 16 is represented by a vector including a specified number of bits representing each of the four guns. Accordingly, in the present example, where each pixel is defined as having thirty-two bits and each gun defined as having eight bits, a given pixel can represented by the vector (R8, G8 B8, Alpha 8).

Because red, green and blue are related in color television practice by matrix operations to luminance Y, chrominance component I and chrominance component Q, the image storage may alternatively be arranged so that each pixel is represented by sets of bits for Y, I, Q, and alpha. Because the human eye discriminates luminance with higher resolution than chrominance, equal number of bits are not required for each component, and the numbers of bits actually assigned in memory for particular components may accordingly be-optimized for the application.

Specific details of example devices and systems available for the construction of embodiments of system 10 can be found in:

U.S. Pat. No. 4,807,189entitled "A Read/Write Memory Having a Multiple Column Select Mode", issued Feb. 21, 1989;
U.S. Pat. No. 4,636,986, entitled "Separately Addressable Memory Array in a Multiple Array Sense Conductor Chip", issued Jan. 13, 1987;
U.S. Pat. No. 4,639,890, entitled "Video Display System Using Memory with Parallel and Serial Access Displaying Selectable Cascaded Serial Shift", issued Jan. 27, 1987;
U.S. Pat. No. 4,562,435, entitled "Video Display System Using Serial/Parallel Access Memories", issued Dec. 31, 1985

Figure 4:
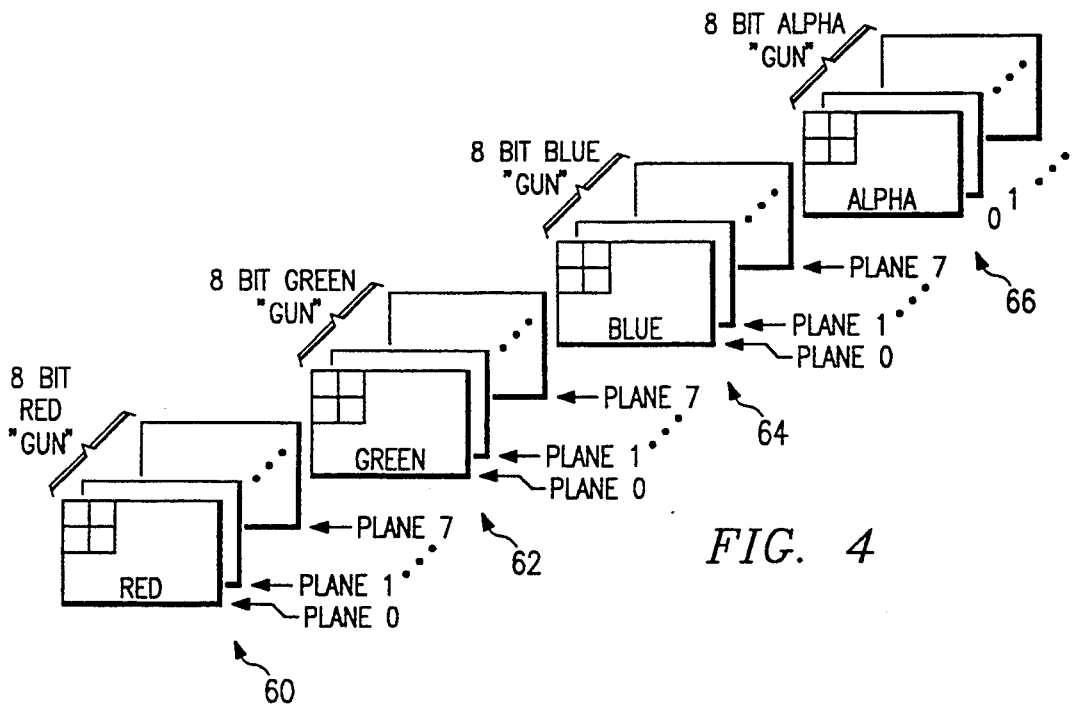
FIG. 4 is a geometric representation of the planes of a video random access memory storing words of pixel data organized into gun portions.

FIG. 4 shows a bit-mapped memory organization of memory 16 in which each pixel is represented by eight bits each of red, green, blue and alpha data (R8, G8, B8, Alpha 8). The depicted organization for memory 16 has thirty-two planes for the thirty-two bits per pixel. The thirty-two planes are organized into four gun portions having 8 planes 0-7 each for red (60), green (62), blue (64) and alpha (66). The bits in each plane are stored in rows and columns corresponding in number in the depicted example to the number of scan lines per frame and number of pixels per line, respectively, in an image. As discussed above, it should be emphasized that the identification of parts of memory as gun portions by color is arbitrary and suggestive of but one typical application. For economy of terminology, however, any division of the memory planes into portions or access of the memory by subsets of memory planes is called "gun oriented" herein. Also, it should be understood that associating bits with pixels according to the bit-mapped organization is not a requirement, and that representations of varying spatial and chromatic precision allow optimization of the image storage. Moreover, those representations can reside anywhere in system memory, such as in SRAM (static ram) on ISP chip 12, as well as in memory 16 as display buffer.

Figure 5:
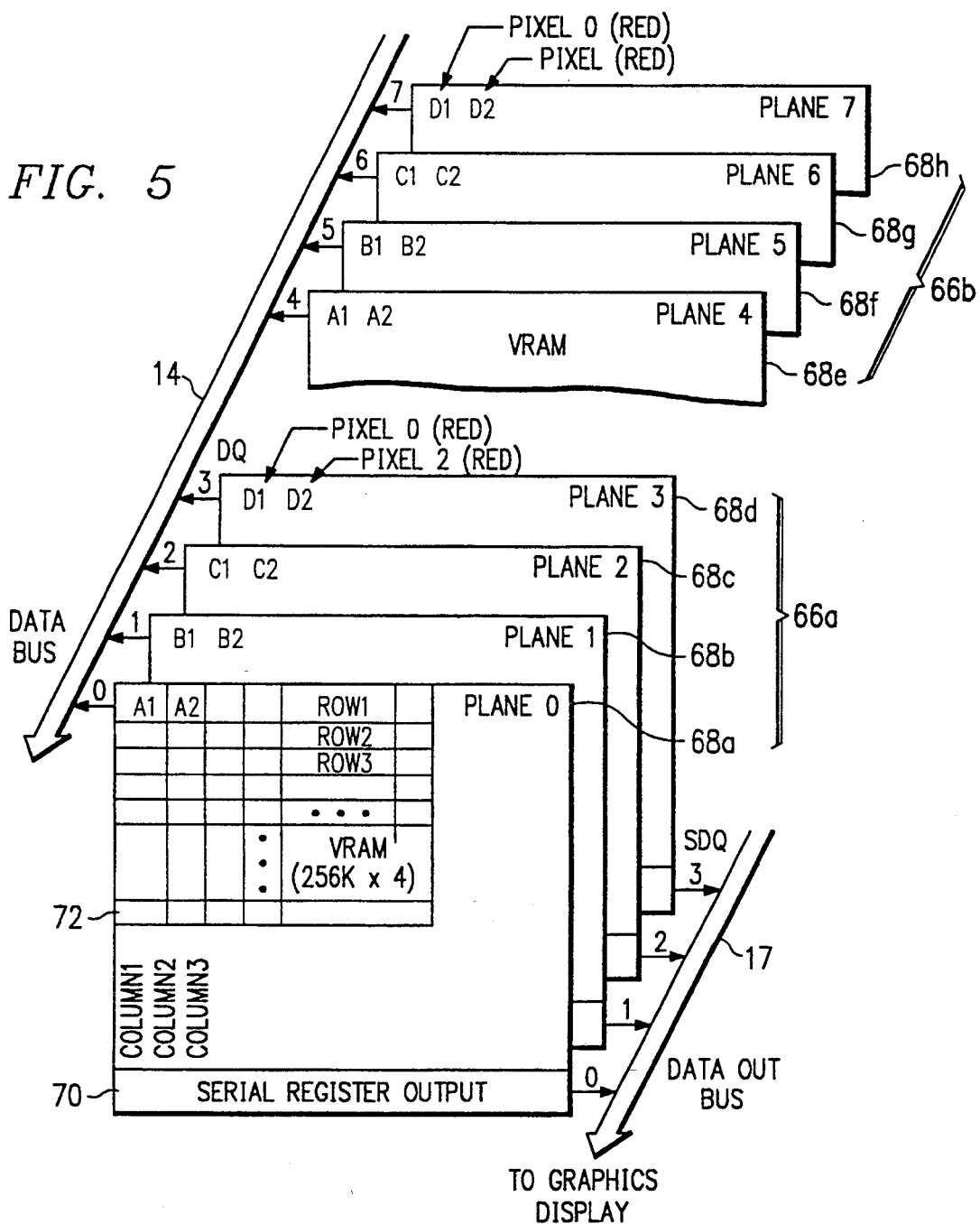
FIG. 5 is a detailed diagram of the planes of a video random access memory holding a selected one of the gun portions shown in FIG. 4.

FIG. 5 emphasizes the advantages of gun orientation, by more fully illustrating as an example single gun portion 60 of memory 16 as shown in FIG. 4. In the example shown in FIG. 5 gun portion 60 is implemented using two 256Kx4 VRAM devices 66a and 66b however, in alternate embodiments other VRAM device architectures, such as 128K×8 VRAMs, may be used. Gun portion 60 is disposed across eight video RAM planes 68a-68h respectively connected for random access to data bus 14. A serial shift register 70 is associated with each video RAM plane and loaded in parallel from the plane. Eight parallel serial shift registers 70 are thus provided for eight planes, and serially provide the eight-bit guns for a line of video at the system horizontal scan rate on a bus 17 to back end chip 22 of FIG. 1 and graphics display 24. It is important to recognize that FIG. 5 is a highly simplified diagram of only one of a number of possible configurations of memory 16. In alternate configurations, each plane may be. established by multiple VRAM or DRAM devices feeding the corresponding shift register 70. Further, data may be provided to bus 17 in any one of a number of ways; shift registers 70 themselves may be constructed as a series of cascaded shift registers, as shown for example in coassigned U.S. Pat. No. 4,639,890.

Gun-oriented memory as described herein advantageously permits rapid operations on gray images (luminance) and on color primaries R, G, and B, for instance. Thus, the preferred embodiments involve memory architectures specially streamlined for selection of access either by whole pixels or parts thereof.

Figure 6:
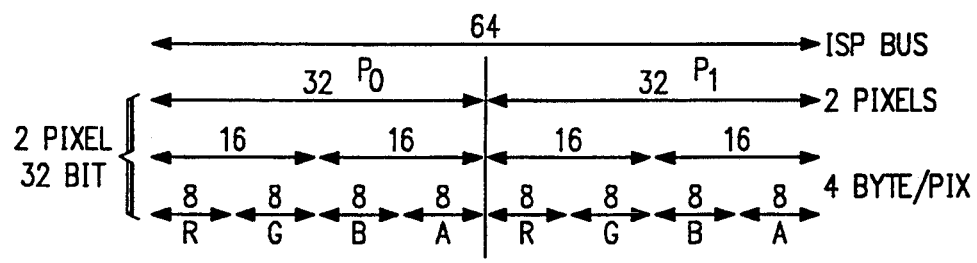
FIG. 6 depicts one possible pixel prefered organization of graphics data on the data bus shown in FIG. 1.
Figure 7:
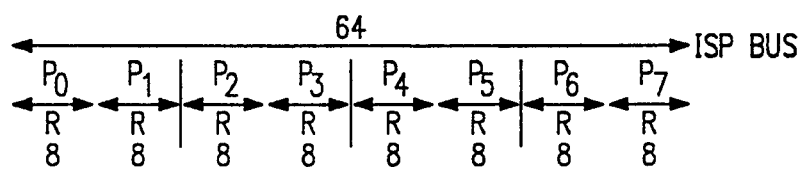
FIG. 7 depicts one possible gun prefered organization of graphics data on the data bus shown in FIG. 1.

FIGS. 6 and 7 distinguish pixel access from gun access. In FIG. 6, a 64-bit wide bus 14 accommodates two 32-bit pixels per access in pixel access mode. In a single memory access, two pixels P0 and P1 are retrieved. Each pixel has four bytes including of R (red), G (green), B (blue), and A (alpha) data. In FIG. 7, the R (red) bytes from not two but eight pixels P0-P7 are accessed in a single memory access in gun access mode.

Bytes from another gun and another set of pixels are independently accessible in another memory access.

Figure 8A:
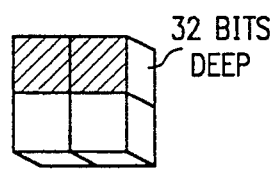
FIGS. 8A and 8B are geometric representation of possible accesses of whole pixels from the memory shown in FIGS. 1, 4 and 5.
Figure 8B:
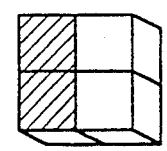

FIG. 8 shows that a data bus 14 which is a multiple in width W of the number P of bits per pixel (in the described example a 64-bit bus supporting two 32-bit pixels), can support pixel accesses from several selections among adjacent pixels in memory 16. In a first selection shown as FIG. 8, adjacent bits of pixels in the same row are selected (a "2×1access"). A second selection is directed to selecting adjacent bits of pixels in the same column (a "1×2 access"). FIGS. 9a–d show four illustrative modes of gun access to memory 16. These modes of memory access permit fast input/output when objects have shape or placement in an 8×8 grid, similar to those shown by grid 72 of FIG. 5. In other words, unnecessary reads and writes are minimized. Grid 72 is illustrative and there is no requirement that it be bordered at top and left.

Figure 9A:
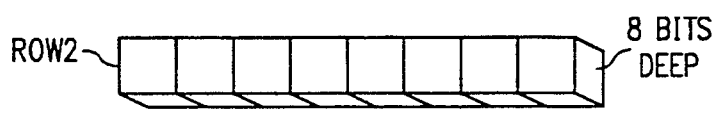
FIGS. 9A-9D are geometric representation of possible accesses of portions of pixels (gun portions) from the memory of FIGS. 1, 4 and 5.

In FIG. 9a, a particular, gun portion (e.g. gun portion 60 of FIGS. 4 and 5) is accessed in each of eight locations in the same row (e.g. ROW2) (i.e. a "1×8 access"). It should be noted that FIG. 9a is representative of bits in all eight rows designated ROW2 in all of the memory planes of selected gun portion 60. These bits have the same eight adjacent column numbers in all of the memory planes, such that in this example, where 8-bit guns are assumed, sixty-four bits are accessed in all.

Figure 9B:
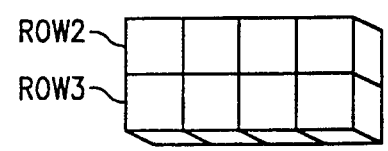

In FIG. 9b, the selected gun portion is accessed in another mode that selects each of eight bits lying in a 2×4 rectangle of bits in two adjacent rows (i.e. a "2×4 access"). In one example, FIG. 9b represents four bits per row in rows ROW2 and ROW3 in the eight memory planes of the selected gun portion. Sixty-four bits total are also accessed in this mode.

Figure 9C:
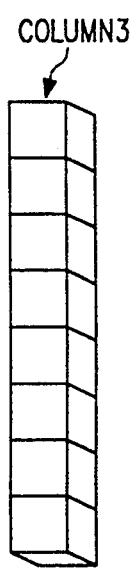

In FIG. 9c, the selected gun portion is accessed in a third mode that selects eight bits in a column (e.g. COLUMN3) of a green plane. In this example, FIG. 9c represents eight bits from the eight columns COLUMN3 in all of the memory planes of the selected gun portion 60, for a total of sixty-four bits (i.e. an "8×1 access").

Figure 9D:
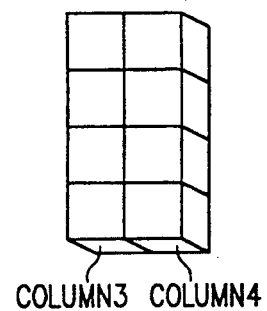

In FIG. 9d, the selected gun portion is accessed in a fourth mode that selects of each of eight bits lying in a 2×4 rectangle of bits in two adjacent columns (i.e. a "2×4 access"). In this example, FIG. 9d represents four bits per column in columns COLUMN3 AND COLUMN4 in the eight memory planes of the selected gun portion, again totaling sixty-four bits.

Figure 10:
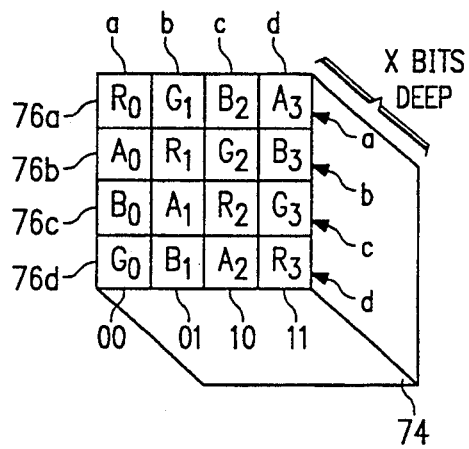
FIG. 10 is a geometric representation of the memory shown in FIG. 1 as partitioned into four banks, each bank organized for pixel preferred accesses, according to one embodiment of the present invention.

FIG. 10 is a geometric representation of a video RAM 74 bank organized according to one embodiment of the present invention into four banks in which the locations for the RGBA gun portions of four pixels are staggered relative to each other in the memory. Each bank is represented by a row having gun portions arranged as: RGBA (76a), ARGB(76b), BARG (76c) and GBAR (76d). Any suitable number X of memory planes (e.g., 8) are provided for each gun portion, as indicated by depth in FIG. 10. As discussed in detail below, the staggered arrangement shown in FIG. 10 advantageously allows accessing of either whole RGBA pixels or the same gun portion (e.g., R) of different pixels. It should be noted that FIG. 10 is only one possible representation of a memory system embodying the concepts of the present invention. In actual physical embodiments, the relationships between the data locations and/or the rows and columns of data locations may vary depending on such factors as the mapping of data to the display, etc.

In the illustrated embodiment, transfer processor 38 (FIG. 3) includes address modification/LSB address bit generating circuitry 78 which supplies four different pairs of LSB address bits to four different video RAM chips or matrices making up RAM bank 74 depicted in FIG. 10. One pair of address bits (designated A1a, A0a) is presented to RAM 74 as the two LSBs lines already available on address bus 15. The remaining three pairs of address bits (designated A1b, A0b; A1c, A0c; and A1d, A0d respectively) are provided by three additional pairs of lines 80a–80c routed from address modifier/LSB generator 78.

Figure 11:
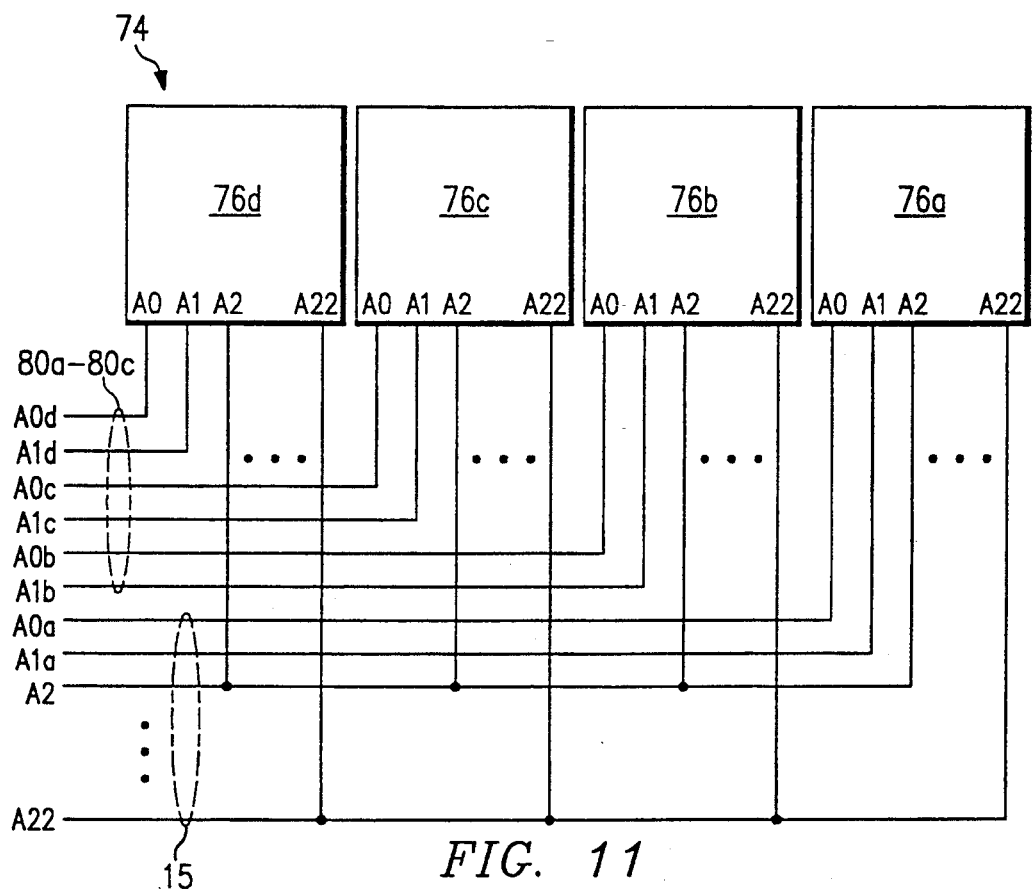
FIG. 11 is a functional block diagram depicting the address interface between the processor of FIG. 1 and the memory of FIG. 1 according to one possible embodiment of the present invention.

FIG. 11 depicts one possible embodiment of RAM 74, in which four video RAMs 76a–76d are connected to address bus 15. The video RAMs each have a 23-bit wide address space A22-A0 (8 megabits) and are illustratively provided as banks corresponding to the rows shown in FIG. 10 (and therefore have been correspondingly given the same designator numbers.) The most significant bit lines A22-A2 of address bus 15 are connected to the corresponding address inputs of all four VRAMs 76a–76d.

The least significant address bits to VRAMs 76a–76d are provided as discussed above—A1a, A0a; A1b, A0b; A1c, A0c; and A1d, A0d respectively connected to the A1,A0 address inputs of VRAMs 76a–76d. Thus, lines A1a, A0a of bus 15 are connected to address inputs A1, A0 of VRAM 76a and so on to pair 80c (A1d, A0d) which is connected to address inputs A1,A0 of VRAM 76d. In FIG. 11, the data random access port and the serial output port described in connection with FIG. 5 are not shown for clarity.

Address modifier/LSB generator circuitry 78 is preferably combinational logic coupled to the destination address generator 44 of transfer processor 38 and is enabled in either a first or a second mode as selected by state machine 40. For a given address on lines A22-A2, address modifier/LSB generator circuitry sets the two LSB's routed to each memory device 76 such that a whole pixel may be accessed (mode 1) or only the gun portions of several pixels may be accessed (mode 2). For illustration purposes, the columns of locations shown in FIG. 10 are accessed by the pairs of LSBs applied to VRAMs 76 as follows:

Column a=00
Column b=01
Column c=10
Column d=11

In the first mode (pixel access) the address modifier/LSB generator 78 simply replicates the LSB address bits on line pair A1a,A0a on to the other three line pairs 80a–80c. In this way the same address location on all of the video RAMs 76a–d is accessed, thereby retrieving all of the bits for all of the guns of given a pixel at once (i.e. the whole pixel is accessed). For example, replicating LSBs 00 across LSB address line pairs A1a, A0a; A1b, A0b; A1c, A0c; and A1d, A0d accesses pixel 0 (i.e. R0,G0,B0,A0). As discussed further below, because the staggered arrangement may change the ordering bytes are output, swizzling may be required to insure proper byte ordering on data bus 14.

In the second mode (gun access) the address modifier/LSB generator 78 supplies address bit pairs according to a pattern accommodating the staggered organization of the gun portions in the memory. In this mode, for each of pair of bits presented on lines A1a, A0A, corresponding sets of pairs of bits for the other three line pairs 80a-80c (A1b, A0b; A1c, A0c; and A1d, A0d) are generated by address modifier/LSB generator, according to the table:

TABLE I

| A1a, A0a | A1b, A0b | A1c, A0c | A1d, A0d |
|---|---|---|---|
| 00 | 01 | 10 | 11 |
| 01 | 10 | 11 | 00 |
| 10 | 11 | 00 | 01 |
| 11 | 00 | 01 | 10 |

The LSB assignments of the first row of the table accesses all of the red gun portions A of FIG. 10. The second, third, and fourth rows access the G, B and Alpha gun portions respectively. The table is constructed from FIG. 10 by starting with row a, column a (memory 76a). This red gun portion is addressed by bits 00. The red gun portion in memory 76b is identified by entry A in row b. Entry A in this case addressed by LSB bits 01 identifying column b in FIG. 10. Therefore, the bits on lines A1b, A0b should be 01 to access the red gun portion of memory 76b. The other entries are determined analogously.

Figure 12:
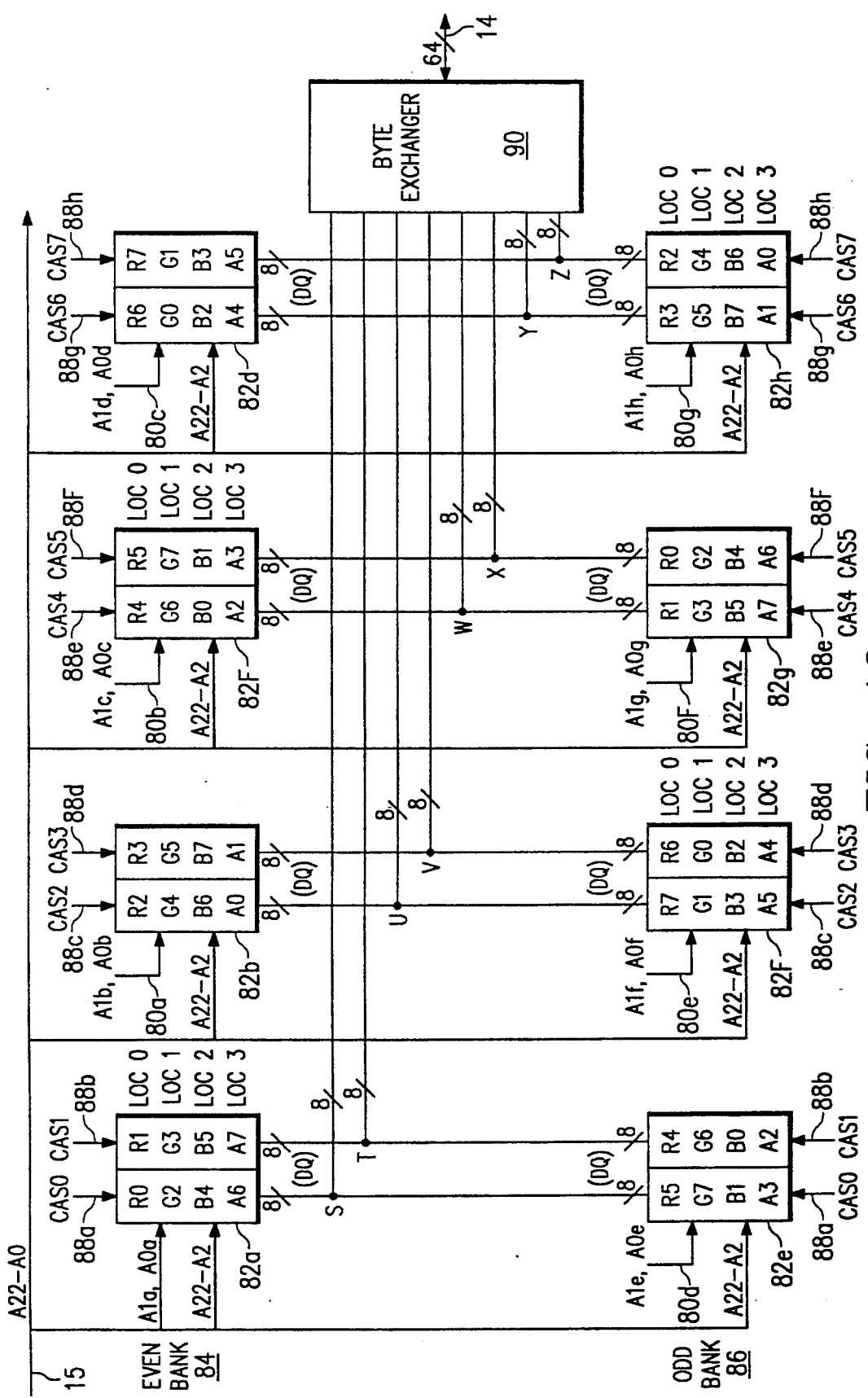
FIG. 12 is a functional block diagram depicting a particular embodiment of the memory of FIG. 1 partitioned into four banks of memory devices, each organized for gun preferred accesses.

FIG. 12 illustrates a particular video memory embodiment in which data addressing is organized for access to the memory array in a "gun preferred mode." Eight video RAMs 82a-h are connected to a data random access bus such as 64-bit data bus 14. In this example, seven pairs of LSB lines 80a-g (i.e. A1b,A0b; A1c, A0c; A1d, A0d; A1e, A1e; A1f, A0f; A1g, A0g; and A1h, A0h) are provided from address modifier/LSB generator 78 to allow flexible accessing through LSB modification. It should be noted that in alternate embodiments, the number of LSB address lines 80 may vary as some lines may be used in common with more than one VRAM.

In the illustrated embodiment, VRAMs 82a-d hold eight pixels of thirty-two bits each from an even line or row in an image being displayed on an interlaced display 26. Collectively, VRAMs 82a-d are designated as even line bank 84. VRAMs 82e-h comprise odd line bank 86 and correspondingly hold pixels from an odd line or row in the interlaced image. All VRAMs 82 are accessed by address bus 15 in the manner similar to that described in connection with FIGS. 10 and 11 above. The most significant address bits A2-A22 from processor 12 are presented to all VRAMs 82 and within each bank 84 or 86, the two LSBs are applied to each individual VRAM from either LSB address lines A1a, A0a available on bus 15 or from one of additional pairs of LSB address lines 80a-g (A1b, A0b; A1c, A0c; A1d, A0d A1e, A1e; A1f, A0f; A1g, A0g; or A1h, A0h) routed from address modifier/LSB generator 78. It should be noted that the serial output port (SDQ) of FIG. 5 and serial output bus 17 are present in the actual physical embodiment but omitted for clarity of illustration in FIG. 12.

In the embodiment illustrated in FIG. 12, a given gun portion of two pixels are stored across the planes of a row of a corresponding VRAM 82. For example, the red gun portions of pixel 0 and pixel 1 are stored across the planes of a row in VRAM 82a designated location 1. Thus, in the case of pixels composed of eight-bit guns, each VRAM such as 82a is preferably a 256K×16 device. Preferably, each VRAM has two column address strobe (CAS) inputs for additional flexibility in accessing data stored therein. It is also important to note that in this example it is assumed that the designations R0-R7 do not designate the 8-bit red gun portion for one pixel but instead designate eight 8-bit red gun portions for pixels 0-7. For example, R0 designates the entire 8-bit red gun portion of pixel 0 and B5 designates the entire 8-bit blue gun portion for pixel 5. Further, it should be recognized that in alternate embodiments, the number of bits per pixel, the number of bits per gun and the number of planes per VRAM may vary depending on the desired system configuration and factors such as the display resolution.

In the gun preferred organization, address modifier/LSB generator 78 in ISP 12 of FIG. 2 is programmed or constructed to organize the gun portions in a given VRAM 82 in RGBA order. Significantly, as shown in FIG. 12, the gun portions stored in each VRAM 82 are taken from all eight pixels in the corresponding bank 84 or 86 in contrast to an alternate embodiment in all the RGBA gun portions from the same pixel are stored in the same VRAM 82. Furthermore, the order of entry of each portion is staggered from VRAM to VRAM in the same bank such as bank 84. For example, the red gun portion of pixel 0 (even bank 84) is stored in VRAM 82a (location 1), the green gun of pixel 0 stored in VRAM 82d (location 2) and so on. As discussed below, this arrangement allows for easy access of either portions of pixels or full pixels as a function of the two least significant bits.

Between banks 84 and 86, the pixel contents of the VRAMs are also staggered. Generally speaking, the bank 86 has VRAMs with data column wise reversed and entries staggered by two VRAMs compared with bank 84. For instance, the odd row pixel data corresponding to the even row pixel data stored in VRAM 82a is stored in VRAM 82g. Additionally, the order of gun portions in VRAM 82g is columnwise the reverse (e.g. R1,R0) of the gun portions in VRAM 82a (R0,R1). It is emphasized that these comparisons do not imply a difference in physical construction of the VRAMs in this embodiment, since they can be all identical. Instead, the comparisons help to define the programming or construction of address modifier/LSB generator 78 when used with a set of VRAMs as in FIG. 12.

For purposes of illustration, the locations in each VRAM 82 have been designated as locations 0-3 (as shown in FIG. 12) and the corresponding LSB address bits designated as follows:

Locations 0=00
Locations 1=01
Locations 2=10
Locations 3=11

Accessing whole pixels or portions of pixels in the gun preferred arrangement of FIG. 12 is similar to that discussed above in connection with FIG. 10. If a 1×8 access is desired (where a given gun portion of eight horizontally adjacent pixels along the same odd or even display line are accessed) the same location in all four VRAMs 82 of the given even (84) or odd (86) bank is accessed. For example, all red guns R0-R7 may be accessed for an even display line in this mode. In this case, the even bank 84 is selected, either through the CAS 88 lines or through a separate bank select line (not shown) and address modifier/LSB generator 78 presents LSB address bits 00 on line pair A1a, A0a of bus 15 and on to the other three line pairs 80a-c (A1b, A0b; A1c, A0c; and A1d, A0d) such that the eight red gun portions (R0-R7) of the given even display line are accessed. Similarly, selecting the odd bank 86 and presenting address 10 on line pairs 80d–h (A1e, A1e; A1f, A0f; A1g, A0g; and A1h, A0h) accesses the blue guns B0–B7 for the given odd display line.

In the first mode, the staggering of the contents of the VRAMs 82 in banks 84 and 86 allows 4×2 blocks of guns (i.e. four guns from the even bank 84 and four guns from the odd bank 86) to be accessed simultaneously using the CAS lines 88. For example, a block of all the red guns for pixels 0,1,2,3 of two adjacent even and odd display lines may be accessed by selecting both the odd an even banks, for example, by activating VRAMS 82a and 82b of the even bank 84 and VRAMS 82g and 82h of the odd bank using CAS lines 88, and providing LSBs of 00 to pairs A1a, A0a; A1bA0b; A1g, A0g; and A1h, A0h. Similar block accesses can be made to the green, blue and alpha gun portions of pixels 0,1,2,3. Further, 4×2 gun accesses can also be made to other blocks of pixels, such as adjacent blocks of pixels 4,5,6, and 7 on the odd and even display lines.

In a second mode, whole pixels can be accessed using the gun preferred configuration shown in FIG. 12. The following tables can be constructed, as was done in above in connection with the discussion of FIG. 10, indicating the corresponding whole pixel accesses from even bank 84 (Table IIa) and odd bank 86 (Table b):

TABLE II

| A1a, A0a | A1b, A0b | A1c, A0c | A1d, A0d | (even) |
|---|---|---|---|---|
| 00 | 11 | 10 | 01 | |
| 01 | 00 | 11 | 10 | |
| 10 | 01 | 00 | 11 | |
| 11 | 10 | 01 | 00 | |

| A1e, A0e | A1f, A0f | A1g, A0g | A1h, A0h | (odd) |
|---|---|---|---|---|
| 00 | 11 | 10 | 01 | |
| 01 | 00 | 11 | 10 | |
| 10 | 01 | 00 | 11 | |
| 11 | 10 | 01 | 00 | |

In the second mode with the gun preferred organization, the LSB assignments of the first rows of TABLE IIa and TABLE IIb access whole pixels 0 and 1 of the selected bank, of the second rows pixels 2 and 3, of the third row whole pixels 4 and 5, and of the fourth row whole pixels 6 and 7. Each of the simultaneous access of two pixels from either bank is an access of a 2×1 block of data in terms of display lines (i.e. 2 horizontally adjacent pixels on one odd or one even display line).

In the second mode using the gun preferred configuration of FIG. 12, it is also possible to access a pair of pixels in a 1×2 manner (i.e. two mutually adjacent pixels, one in an even display line and one from adjacent odd line) using the CAS lines 88. This capability is advantageously provided by the columnwise reversal of the gun portions between the even bank 84 and the odd bank 86. For example, an 00 may be applied to address line pairs A1a, A0a; A1b, A0b; A1c, A0c; and A1d, A0d while a 10 is applied to address line pairs A1e, A0e; A1f, A0f; A1g, A0g; and A1h, A0h. The column address strobe (CAS) lines 88 can then be used to select for simultaneous access through bus 14 pixels 0 (guns Ro, Go, Bo, Ao) from both odd bank 86 and even bank 84, or in the alternative, select pixels 1 (guns $R_1$, $G_1$, $B_1$, $A_1$) from each bank for simultaneous output.

Figure 13:
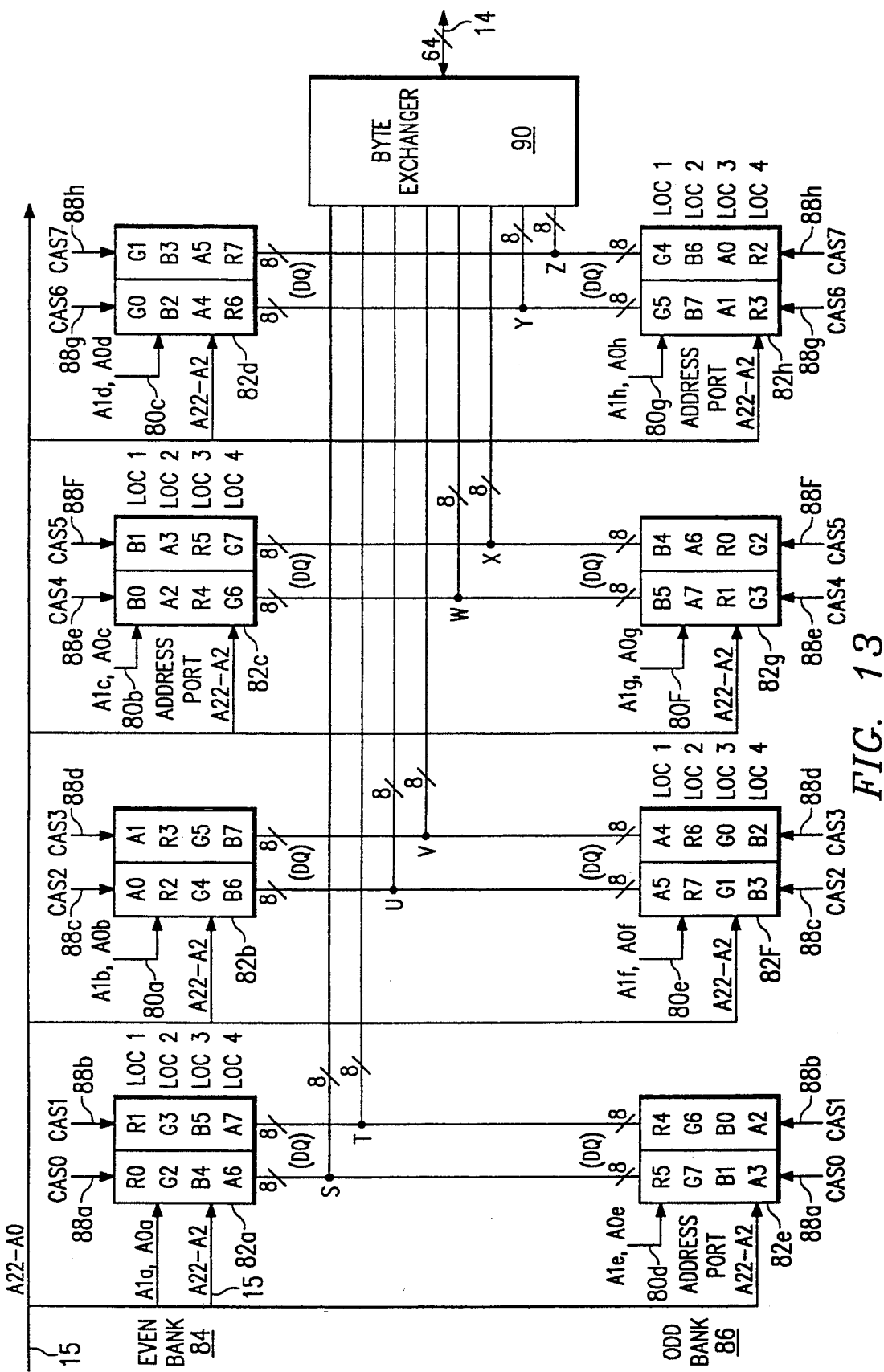
FIG. 13 is a functional block diagram depicting a particular embodiment of the memory of FIG. 1 partitioned into four banks of memory devices, each organized for pixel preferred accesses.

FIG. 13 depicts an alternate embodiment in which address modifier/LSB generator 78 organizes accesses to VRAMs in a "pixel preferred" arrangement. For simplicity, the same storage location assignments discussed above in connection with the gun preferred mode will be assumed in the following examples. In this embodiment the functioning of the modes is "reversed" from that of the "gun preferred" organization. In the first mode two adjacent pixels in the same display line can be accessed from the corresponding VRAM bank (i.e. a 2×1 access). For example, in the first mode whole pixels 0 and 1 from odd bank 86 can be simultaneously accessed through bus 14 by selecting all planes of VRAMs 82e–h for access through bus 14 using the CAS lines 88 and presenting LSBs of 00 to line pairs A1e, A0e; A1f, A0f; A1g, A0g; and A1h, A0h. Alternatively, by using the CAS lines a 1×2 access of two whole pixels can be performed in the first mode. For example, in the illustrated embodiment pixel 0 for adjacent even and odd display lines can be accessed presenting an 00 to line pairs A1a, A0a; A1b, A0b; A1c, A0c; and A1d, A0d while a 10 is applied to line pairs A1e, A0e; A1f, A0f; A1g, A0g; and A1h, A0h and using the CAS lines 88 to select the planes of each addressed location in each bank containing pixel 0 RGBA data.

The second mode is used with the pixel preferred organization to access the individual gun portions of the stored pixels. Address modifier/LSB generator 78 again modifies the two LSBs provided on the A1a, A0a; A1b, A0b; A1c, A0c; A1d, A0d; A0d A1e, A0e; A1f, A0f; A1g, A0g; and A1h, A0h lines for a given address. In the second mode and using the gun preferred organization, the LSB assignments of the first rows of TABLE II a and TABLE II b access the red gun portions of each of the pixels 0–7 in the selected even or odd bank, the assignments of the second rows access the green guns of pixels 0–7 of the selected bank, the third rows the blue guns and the fourth rows the alpha guns. Thus, for example, to perform a 1×8access to the red guns of an even display line, the VRAMs 82 of the even bank 84 are selected using the CAS lines 88, and LSBs applied to the LSB line pairs in accordance with the first row of TABLE a.

Using the pixel preferred organization 2×4 accesses of selected gun portions can also be performed in the second mode. As an example, presenting LSBs of 00 on line pair A1a, A0a, 01 on line pair A1b, A0b, 10 on line pair A1g, A0g, and 11 on line pair A1h, A0h, and activating the VRAMs 82a, b, g and h using the CAS lines, allows the access of the red gun portions of pixels 0–3 from the even bank 84 and pixels 0–3 of the odd bank 86. In a similar fashion, access can be made to the blue, green and alpha gun portions as well as to the gun portions of pixels 4–7 of each bank.

In FIGS. 12 and 13, a byte exchanger or swizzler 90 is provided for reordering the bytes of data being output from VRAMs on to bus 14. It is important to note that because of the varying organization of the data within VRAMs 82, the ordering of the pixel data on the bus may consequently vary creating compatibility problems with backend chip 22 and display 24. In the illustrated embodiment, byte exchanger 90 under control of ISP 12 simply orders the guns of pixel data being output bus 14, such as in the ordering previously described in connection with FIGS. 6 and 7 above, such that the proper data is sent to the proper display drivers. Byte rotator 90 may constructed in accordance with coassigned U.S. Pat. No. 5,287,940,420.

Figure 14:
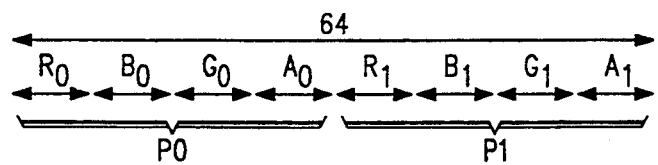
FIG. 14 depicts a typical access of a pair of pixels from the memory of FIG. 1 on a 64-bit wide bus using a pixel preferred data organization.
Figure 15:
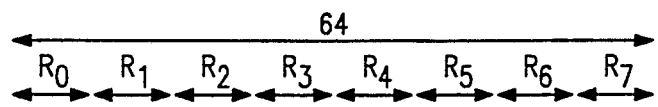
FIG. 15 depicts a typical access of the red gun portions of two pixels from the memory of FIG. 1 onto a 64-bit wide bus using a gun preferred organization.

FIG. 14 shows a typical access of a pair of pixels in memory 74 on a 64-bit wide bus in pixel mode. A pair of 32-bit pixels P0 and P1 each have a quadruplet of 8-bit gun portions. In this way the bus carries pixel P0 gun portions R0,B0,G0,A0 and pixel P1 gun portions R1,B1,G1,A1, reading from left to right across the breadth of the bus in FIG. 14. This arbitrary assignment RGBARGBA of gun portions to the breadth of the bus is advantageously maintained regardless of which two pixels are accessed in pixel mode. In this way processing by ISP 12 and display operations mediated by back end chip 22 are standardized and simplified. In FIG. 15, gun mode arbitrarily is arranged to produce a physical arrangement illustrated by red guns R0, R1, R2, R3, R4, R5, R6, R7 across the breadth of bus 14. These are suitably taken from any octuplet of adjacent pixels arranged in order across bus 14 corresponding to their order across the screen for instance. The same ordering is applicable in the gun mode to the blue, green and alpha guns as necessary.

In the illustrated embodiments, Byte exchanger 90 advantageously rearranges bytes retrieved from memory to produce the physical arrangement FIG. 14 or FIG. 15 that is required for compatibility with programs and hardware of ISP 12 and back end chip 22. In other words, if the memory allocation of pixels and gun portions does not produce the physical arrangement of FIG. 14 or 15 upon access in pixel mode or gun mode respectively, then the byte exchanger 90 makes the desired rearrangement.

As discussed above, FIGS. 12 and 13 show two embodiments that illustrate how to use the replicated address method to access either whole pixels or guns. Both figures show accessing either two 32-bit pixels or eight 8-bit guns over a 64-bit data bus, but the concepts can be applied to other pixel, gun and bus sizes. The figures also show a multiple bank systems that supports accessing rectangular arrays of pixels as shown in FIGS. 8 and 9.

The labels within memories 82a-h illustrate one arrangement according to the invention in which the data is stored in each memory for eight consecutive pixels in for locations (LOC0-LOC3) of the memories. While only 8 pixels are shown, this pattern of storage is then cyclical for the pixel data stored in the memory; for example in FIG. 12 in the bank labeled "EVEN BANK", red pixel 8 is stored in location 4 in the group of bits selected by 88a CAS0. It should be understood that the ordering of pixel storage locations shown in FIGS. 12 and 13 are only two of many possible orderings that could be used to achieve the same purpose.

The column address strobes (CAS0-7) serve two purposes; first, they strobe the addresses into the memories, and second, they act as chip enables for DRAMs. As chip enables on write operations, if the corresponding CAS signal is not active, then the data will not be written. On read operations if the CAS signal is not active, then the output of the DRAM will remain in a high impedance state. While the preferred embodiment shows using the CAS signals for the select function on reads and write, it should be understood that other equivalent methods could also be used to accomplish the same effect.

FIGS. 12 and 13 show two banks labeled "Odd" and "Even". In the preferred embodiment, these banks will correspond to alternating horizontal display lines of the display. It should be noted that how the pixels are stored in the odd and even banks is different. The difference in ordering helps achieve a second object of the invention, namely to achieve the ability to access rectangular patches of pixels as shown in FIGS. 8 and 9.

In the preferred embodiment, 64-bits can be read from (or written to) a combination of the two banks. FIGS. 12 and 13 show how the two banks are connected together. Each byte of data lines, labeled S, T, U, V, W, X, Y, and Z, in the even bank is wired to a set of data lines in the odd bank in a "wired OR" arrangement as is common with banked memory systems. Only one of the corresponding CAS lines 88 will be active in either the odd or even bank. In a normal banking arrangement, however, only even or odd bank CAS lines 88 would be active, but in the preferred embodiment, a combination of CAS lines 88 from the even and odd banks, can be active so long as corresponding CAS lines in both banks are not both active at the same time.

The combination of different least significant bits of address and CAS signals provides a matrix selection capability for reading out different pieces of information in different ways. By various combinations either 2 32-bit pixels can be read or 8 bit guns from 8 different pixels. Also the pixels can be read out either linearly or as a rectangular array of pixel.

Table III below shows some examples, for the configurations of FIG. 12, of how the various combinations of least significant address bits and CAS lines activations can be used to select various combinations of outputs on the data lines S-Z to bus 14. The pairs of address lines are listed as well as whether each CAS line is active for the even(E) or add(O) bank. The corresponding data that is output or written is shown under columns S-Z. Each output is abbreviated with a leading E or 0 to signify whether the value comes from the even or odd line (or bank). For example, the designation EG7 means that the green gun from pixel seven in the even bank is being accessed.

For the first 4 examples of table III, the output is relatively straight forward. The 8 consecutive values for each gun of an even line is read out as bytes S-Z of the data bus 14. Note, however, that while the red gun values R0-R7 read out in one order, the values for the corresponding green, blue and alpha (G, B, and A) all read out in different orders with respect to the bus bytes S-T. The byte exchanger 90 can be used to re-order the data coming in on lines S-Z to always come out in the same order (say from 0 to 7), and thus easier to be processed or generated.

Examples 5-7 shows how data is read out of the even bank with the same least significant address bits applied. Note that all the data is read out for 8 horizontally adjacent guns as in examples 1-4, but that the data is in a different order. The byte exchanger 90 can put them into sequential order if need be.

In table III, examples 9 and 10 show ways to read out 2 whole horizontally adjacent pixels at a time. In the case of example 9, pixels 0 and 1 of the even line (or any multiple of 8 thereof) are read out, and with example 10, pixels 4 and 5 are read out. Once again it should be noted that while the data is available across the bytes S-Z they are in different orderings and thus the byte exchanger 90 could be used to put them in the same order. Similarly pixel pairs 2 and 3 or 6 and 7 could be read out by sending different values to address lines A0a-d and A1a-d. The pixels on the Odd lines could be read out be activating the CAS signal on the Odd bank rather than the even bank.

TABLE III

Examples of how to access data in FIG. 12

| EX. | A0a, A1a | A0b, A1b | A0c, A1c | A0d, A1d | A0e, A1e | A0f, A1f | A0g, A1g | A0h, A0h | CAS0 | CAS1 | CAS2 | CAS3 | CAS4 | CAS5 |
|-----|----------|----------|----------|----------|----------|----------|----------|----------|------|------|------|------|------|------|
| 1 | 00 | 00 | 00 | 00 | xx | xx | xx | xx | E | E | E | E | E | E |
| 2 | 01 | 01 | 01 | 01 | xx | xx | xx | xx | E | E | E | E | E | E |
| 3 | 10 | 10 | 10 | 10 | xx | xx | xx | xx | E | E | E | E | E | E |
| 4 | 11 | 11 | 11 | 11 | xx | xx | xx | xx | E | E | E | E | E | E |
| 5 | xx | xx | xx | xx | 00 | 00 | 00 | 00 | O | O | O | O | O | O |
| 6 | xx | xx | xx | xx | 01 | 01 | 01 | 01 | O | O | O | O | O | O |
| 7 | xx | xx | xx | xx | 10 | 10 | 10 | 10 | O | O | O | O | O | O |
| 8 | xx | xx | xx | xx | 11 | 11 | 11 | 11 | O | O | O | O | O | O |
| 9 | 00 | 11 | 10 | 01 | xx | xx | xx | xx | E | E | E | E | E | E |
| 10 | 10 | 01 | 00 | 11 | xx | xx | xx | xx | E | E | E | E | E | E |
| 11 | 00 | 11 | 10 | 01 | 11 | 10 | 00 | 11 | E | O | E | O | E | O |
| 12 | xx | 10 | 01 | xx | 10 | xx | xx | 01 | O | O | E | E | E | E |

| EX. | CAS6 | CAS7 | S | T | U | V | W | X | Y | Z |
|-----|------|------|---|---|---|---|---|---|---|---|
| 1 | E | E | ER0 | ER1 | ER2 | ER3 | ER4 | ER5 | ER6 | ER7 |
| 2 | E | E | EG2 | EG3 | EG4 | EG5 | EG6 | EG7 | EG0 | EG1 |
| 3 | E | E | EB4 | EB5 | EB6 | EB7 | EB0 | EB1 | EB2 | EB3 |
| 4 | E | E | EA6 | EA7 | EA0 | EA1 | EA2 | EA3 | EA4 | EA5 |
| 5 | O | O | OR5 | OR4 | OR7 | OR6 | OR1 | OR0 | OR3 | OR2 |
| 6 | O | O | OG7 | OG6 | OG1 | OG0 | OG3 | OG2 | OG5 | OG4 |
| 7 | O | O | OB1 | OB0 | OB3 | OB2 | OB5 | OB4 | OB7 | OB6 |
| 8 | O | O | OA3 | OA2 | OA5 | OA4 | OA7 | OA6 | OA1 | OA0 |
| 9 | E | E | ER0 | ER1 | EA0 | EA1 | EB0 | EB1 | EG0 | EG1 |
| 10 | E | E | EB4 | EB5 | EG4 | EG5 | ER4 | ER5 | EA4 | EA5 |
| 11 | E | O | ER0 | OB0 | EA0 | OG0 | EB0 | OR0 | EG0 | OA0 |
| 12 | O | O | OG7 | OG6 | EG4 | EG5 | EG6 | EG7 | OG5 | OG4 |

Example 11 shows how the even and odd CAS selects can be used to read two vertical 32-bit pixels. All the components for pixel 0 of both the even and odd lines are read out over bytes S–Z of the data bus 14. Once again the data is scrambled and it would be desirable to use the byte exchanger 90 to re-order them into two adjacent pixels. Similarly, any two vertical pixels can be read out by different combinations of address line value and CAS values, with different de-scrambling by the byte exchanger 90.

Example 12 shows how to read a 4 horizontal by 2 vertical array of gun values. In this example the green guns 4–7 on two lines are read. Once again all the values are available over bytes S–Z and the byte exchanger 90 can be used to put them in a more useful ordering for processing. Similarly the other guns and locations can be read out in a 4 by 2 array.

It should be understood that if less flexibility is needed, fewer replicated address lines and/or CAS lines can be used. For example, if it is not necessary to be able to read 2 pixels horizontally or vertically as in example 11 above, then address lines A0a–d and A0e–h as well as lines A1a–d and A1e–h correspondingly do not have to be separate lines (for example A0a and A0e can be the same).

Table IV below shows some examples, for the configurations of FIG. 13, of how the various combinations of least significant address bits and CAS lines can be used to select various combinations of outputs on the data bus S–Z.

Examples 1 to 4 of Table IV show how 2 whole pixels can be accessed for the even lines, and examples 5 to 8 show the accesses for the odd lines. The byte exchanger can be used to put the pixels in the same order for processing.

Example 9 of Table IV shows how a given gun, in this case the red gun, can be accessed by sending different least significant addresses to each of the memories. Example 10 shows accessing the corresponding green gun. In these examples, 8 horizontally consecutive guns are accessed and the byte exchanger 90 could be used to put them in a better order for processing.

TABLE IV

Examples of how to access data in FIG. 13.

| EX. | A0a, A1a | A0b, A1b | A0c, A1c | A0d, A1d | A0e, A1e | A0f, A1f | A0g, A1g | A0h, A0h | CAS0 | CAS1 | CAS2 | CAS3 | CAS4 | CAS5 |
|-----|----------|----------|----------|----------|----------|----------|----------|----------|------|------|------|------|------|------|
| 1 | 00 | 00 | 00 | 00 | xx | xx | xx | xx | E | E | E | E | E | E |
| 2 | 01 | 01 | 01 | 01 | xx | xx | xx | xx | E | E | E | E | E | E |
| 3 | 10 | 10 | 10 | 10 | xx | xx | xx | xx | E | E | E | E | E | E |
| 4 | 11 | 11 | 11 | 11 | xx | xx | xx | xx | E | E | E | E | E | E |
| 5 | xx | xx | xx | xx | 00 | 00 | 00 | 00 | O | O | O | O | O | O |
| 6 | xx | xx | xx | xx | 01 | 01 | 01 | 01 | O | O | O | O | O | O |
| 7 | xx | xx | xx | xx | 10 | 10 | 10 | 10 | O | O | O | O | O | O |
| 8 | xx | xx | xx | xx | 11 | 11 | 11 | 11 | O | O | O | O | O | O |
| 9 | 00 | 01 | 10 | 11 | xx | xx | xx | xx | E | E | E | E | E | E |
| 10 | 01 | 10 | 11 | 00 | xx | xx | xx | xx | E | E | E | E | E | E |
| 11 | 00 | 11 | 10 | 01 | 11 | 10 | 00 | 11 | E | O | E | O | E | O |
| 12 | xx | 10 | 11 | xx | 01 | xx | xx | 00 | O | O | E | E | E | E |

| EX. | CAS6 | CAS7 | S | T | U | V | W | X | Y | Z |
|-----|------|------|---|---|---|---|---|---|---|---|
| 1 | E | E | ER0 | ER1 | EA0 | EA1 | EB0 | EB1 | EG0 | EG1 |
| 2 | E | E | EG2 | EG3 | ER2 | ER2 | EA2 | EA3 | EB2 | EB3 |
| 3 | E | E | EB4 | EB5 | EB4 | EG5 | ER4 | ER5 | EA4 | EA5 |
| 4 | E | E | EA6 | EA7 | EB6 | EB7 | EG6 | EG7 | ER6 | ER7 |

TABLE IV-continued

| Examples of how to access data in FIG. 13. | | | | | | | | | | |
|---|---|---|---|---|---|---|---|---|---|---|
| 5 | O | O | OR5 | OR4 | OA5 | OA4 | OB5 | OB4 | OG5 | OG4 |
| 6 | O | O | OG7 | OG6 | OR7 | OR6 | OA7 | OA6 | OB7 | OB6 |
| 7 | O | O | OB1 | OB0 | OG1 | OG0 | OR1 | OR0 | OA1 | OA0 |
| 8 | O | O | OA3 | OA2 | OB3 | OB2 | OG3 | OG2 | OR3 | OR2 |
| 9 | E | E | ER0 | ER1 | ER2 | ER3 | ER4 | ER5 | ER6 | ER7 |
| 10 | E | E | EG2 | EG3 | EG4 | EG5 | EG6 | EG7 | EG0 | EG1 |
| 11 | E | O | ER0 | OB0 | EA0 | OG0 | EB0 | OR0 | EG0 | OA0 |
| 12 | O | O | OG7 | OG6 | EG4 | EG5 | EG6 | EG7 | OG5 | OG4 |

Example 11 in table IV shows how to access two vertically adjacent 32-bit pixels. In the specific example the pixel 0 of the even and odd line are accessed, but by changing the address and CAS signals, any pair of vertically adjacent pixels can be accessed. Once again it may be advantages to use the byte exchanger 90 to put the data in a consistent order.

Example 12 in table IV shows how a 4 horizontal by 2 vertical array of guns (in this specific case the green gun) can be obtained. Other guns or other locations of the green gun can be obtained by changing the addresses and/or the CAS lines.

Figure 16:
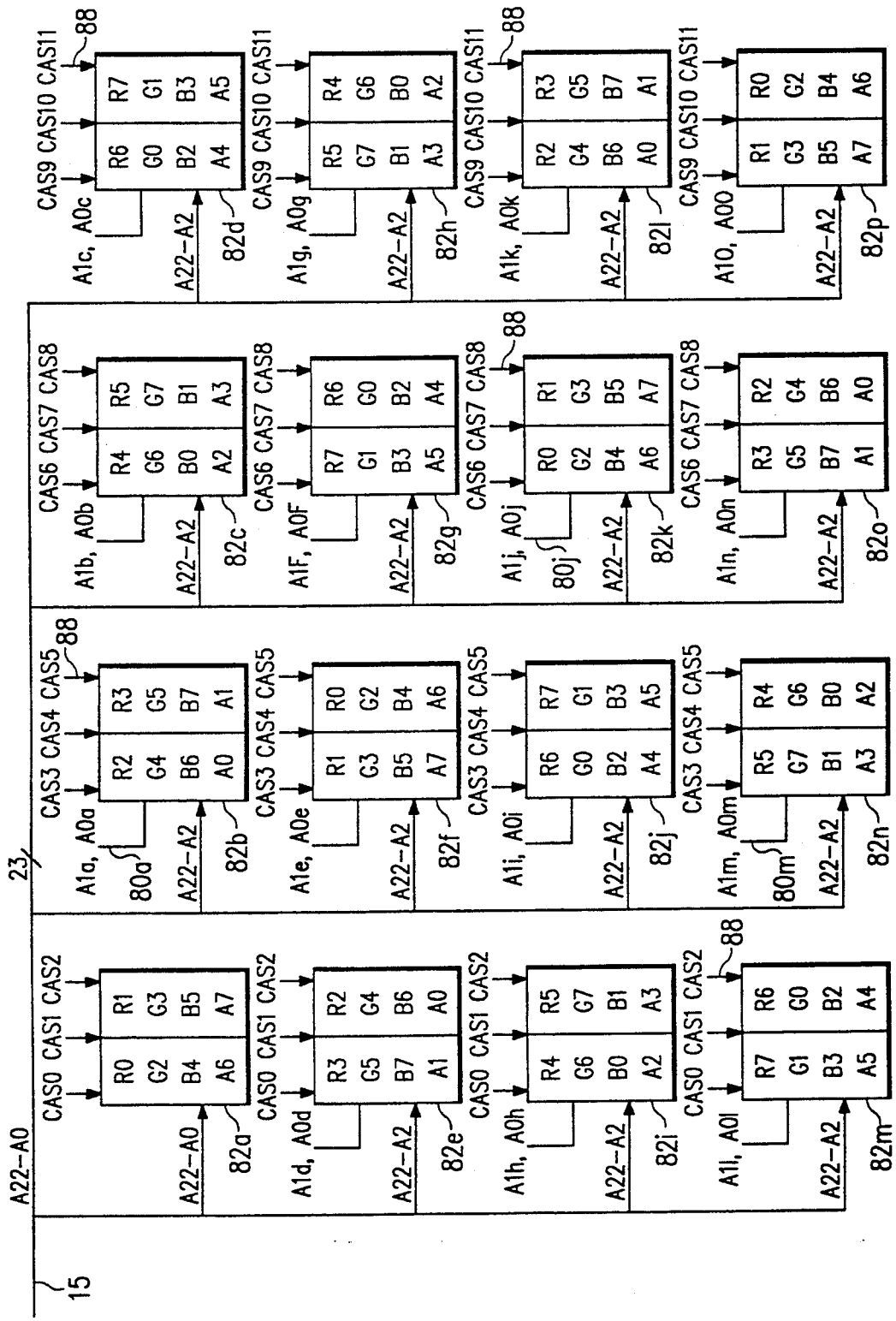
FIG. 16 depicts a second particular embodiment of the memory of FIG. 1 using four banks of four memory devices, the locations within each memory device organized for gun preferred accesses.
Figure 17:
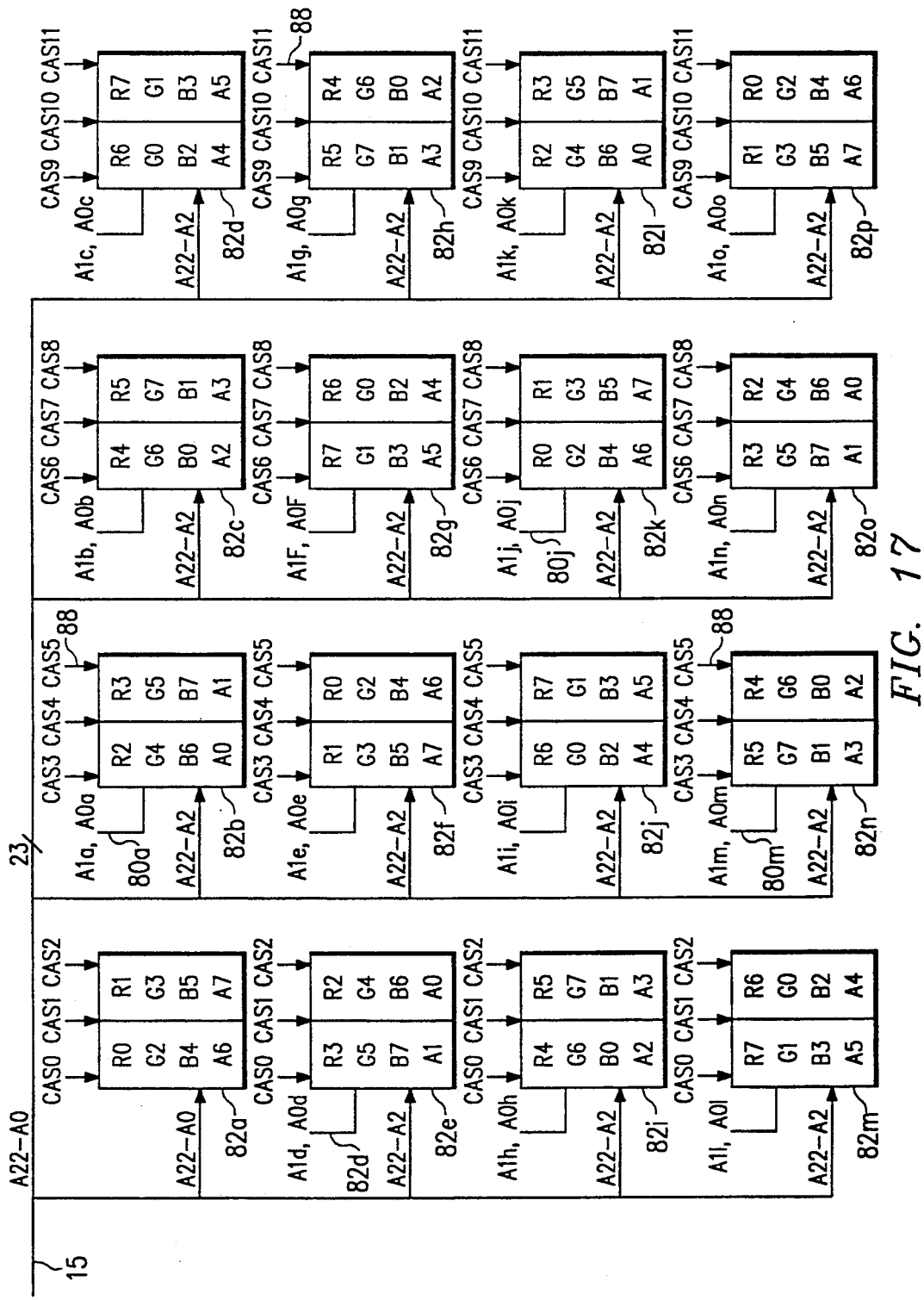
FIG. 17 depicts a second particular embodiment of the memory of FIG. 1 using four banks of four memory devices, the locations within each memory device organized for pixel preferred accesses.

It should be noted that the present inventive concepts are not limited in application to embodiments employing banks of four or eight VRAMs. Sixteen VRAMs (four banks of four) may used which would further allow for 4×2 [i.e., a block of pixels from four rows and two columns]. Using eight banks of VRAMs will allow even further accesses, such as 8×1 access [i.e., eight virtually adjacent pixels in a column]. Additional CAS lines and LSB line pairs are added to provide for the additional VRAMs consequent additional combinations of accesses. Example gun preferred and a pixel preferred organizations using 16 VRAMs are shown in FIGS. 16 and 17, respectively.

Figures 18, 19:
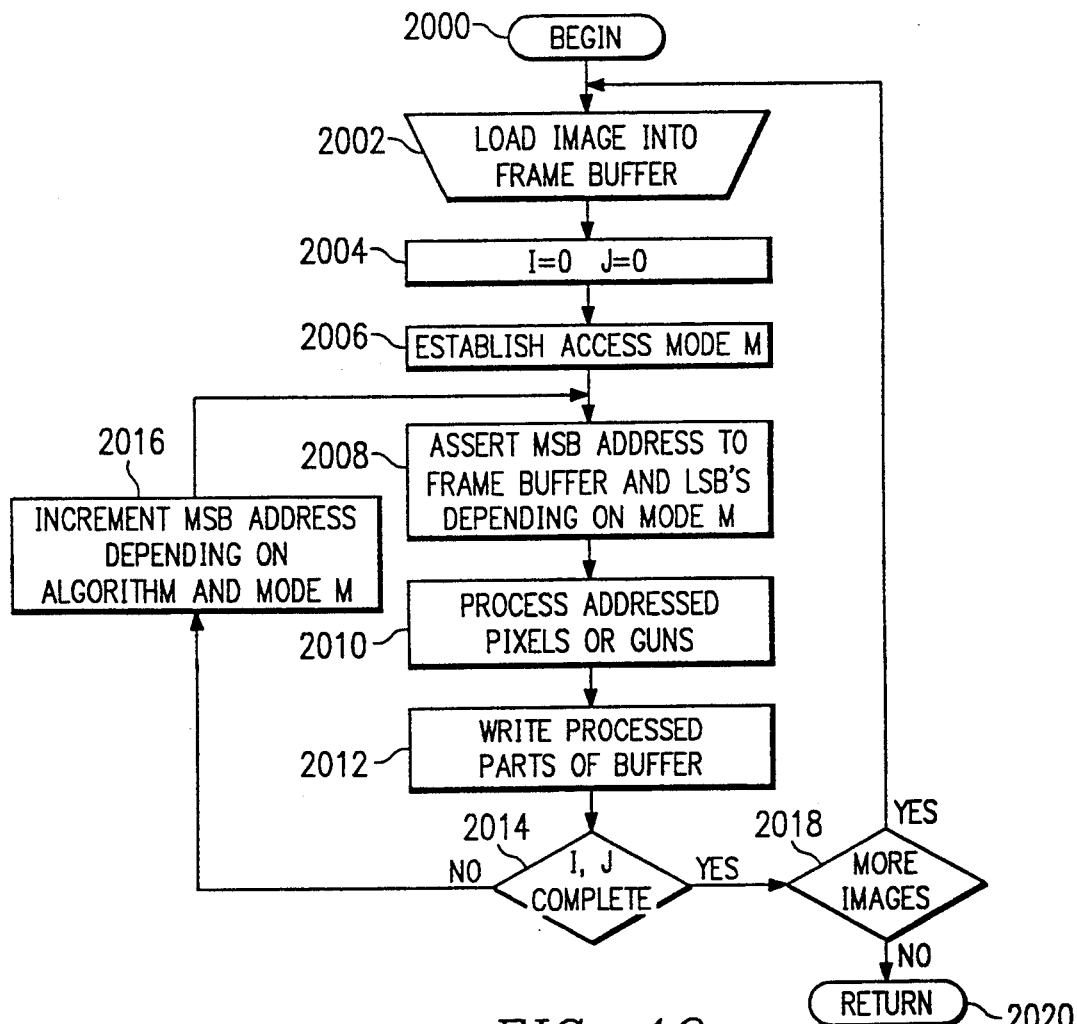
FIG. 18 is a diagram depicting one particular mapping of pixel data from the memory of FIG. 1 to the rows and columns of pixels on the screen of the display device shown in FIG. 1.
FIG. 19 is a flow chart illustrating a method of operating the processor of FIG. 1.

FIG. 18 illustrates a screen format representation of pixels in rows corresponding to lines on a screen. Only the first several pixels 0-16 of lines having hundreds of pixels per line are shown, for clarity. Processing can advantageously occur in pairs of pixels in pixel preferred mode or in octuplets of gun portions in gun (primary) preferred mode.

FIG. 19 illustrates an operational process or method of operating ISP 12 and frame buffer—operating in the gun preferred arrangement of FIG. 12 in the manner suggested by FIG. 18. Operations commence with a BEGIN 2000 and proceed to a step 2002 wherein the frame buffer of FIG. 12 is initially loaded with a frame, such as a frame representing an entire image. Indices I and J of step 2004 are initialized to zero and an access mode M (i.e., selected mode 1 or mode 2 discussed above) is established by ISP 12 for address modifier/LSB generator 74 in step 2006. Processing of the image includes a step 2008 of asserting an address to the frame buffer which is accompanied by LSB addresses on the LSB address lines A0a, A1a; A0b, A1b; A0c, A1c; A0d, A1d; A0e, A1e; A0f, A1f; A0g, A1g; and A0h, A1h. Depending on the mode established by ISP 12, the addressing retrieves a pair of entire 32-bit pixels or an octuplet of gun portions from the frame buffer. Processing of the retrieved data occurs in a step 2010 whence the processed parts are written back to the frame buffer 2012 in step 2012 when desired.

A test 2014 determines whether the entire frame has been processed. If not, then in a next step 2016, the address to the frame buffer is incremented as a function of incremented column J and then incremented row I, by any desired amount depending on the program being executed and the access mode M. Operations loop back to step 2008. Then, pixels 8–15 in lines 0 and 1 are processed for example. Additional loops exhaust all pixels in lines 0 and 1 by incrementing index J to a number equal to the number of pixels per line divided by eight. Then incrementing step 2016 increments row index I and resets index J to access pixels 0–7 of rows 3 and 4 of FIG. 18. Operations work their way through processing of lines 3 and 4, and then go on to a next pair of lines until index J reaches the number of lines per frame divided by two. When the image is completely processed as thus determined by test step 2014, operations branch to a test step 2018. If more images should be loaded into the frame buffer for processing, operations loop back to step 2002. Otherwise, operations are completed and a RETURN 2020 is reached.

Backend graphics chip 22 in a preferred embodiment includes programmable color palette that provides versatile multiplexing schemes and VRAM serial port controls. The TMS34075 color palette chip is one already available palette chip from Texas Instruments Incorporated, described in U.S. Pat. No. 4,799,053 issued Jan. 17, 1989 which patent is hereby incorporated herein by reference. Preferably, backend chip 22 also includes a byte exchanger, similar to byte exchanger 90, for insuring that words of data being sent to display 24 from bus 17 are properly ordered. In the present improved backend chip the architecture is free of horizontal frequency clock distribution. Applications in CAD/CAM workstations, image, and video processing are suited to this architecture.

A few preferred embodiments have been described in detail hereinabove. It is to be understood that the scope of the invention comprehends embodiments superficially different from those described yet within the inventive scope. For a few examples, color display devices utilized in combination can be raster-scanned cathode ray tube monitors, other raster-scanned devices, devices that are not raster-scanned and have parallelized line or frame drives, color printers, film formatters, and other hard copy displays, liquid crystal, plasma, holographic, deformable micromirror, and other displays of non-CRT technology, and three-dimensional and other nonplanar image formation technologies.

Microprocessor and microcomputer in some contexts are used to mean that microcomputer requires a memory; the usage herein is that these terms can also be synonymous and refer to equivalent things. The phrase processing circuitry comprehends ASIC circuits, PALs, PLAs, decoders, memories, non-software based processors, or other circuitry, or digital computers including microprocessors and microcomputers of any architecture, or combinations hereof. Palette in some contexts refers to a specific look-up table device and in the present work it also comprehends alternative color data word generation combined with one or more associated circuits such as digital to analog converter, selectors, timing controls, and functional and testability circuits and interfaces.

Internal and external connections can be ohmic, capacitive, direct or indirect via intervening circuits or otherwise as desirable. Implementation is contemplated in discrete components or fully integrated circuits in silicon, gallium arsenide, and other electronic materials families as well as in optical-based or other technology-based forms and embodiments.

It should be understood that various embodiments of the invention can employ hardware, software or microcoded firmware. Process diagrams herein are also representative of flow diagrams for microcoded and software based embodiments. While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to this description. It is therefore contemplated that the appended claims cover any such modifications or embodiments as fall within the true scope of the invention.

Although the present invention and its advantages have been described in detail, it should be understood that various changes, substitutions and alterations can be made herein without departing from the spirit and scope of the invention as defined by the appended claims.

What is claimed is:

1. A processing system operating on data words each having at least first and second portions comprising:
    a first memory bank comprising:
        first memory, first and second sets of address inputs associated with said first memory, including a first storage location for storing said first portion of a first data word and accessible by a first set of address bits being received at said first set of address inputs and a second set of address bits being received at said second set of address inputs, and a second storage location for storing said second portion of a second data word and accessible by said first set of address bits being received at said first set of address inputs and a third set of address bits being received at said second set of address inputs; and
        second memory, first and second sets of address inputs associated with said second memory, including a first storage location for storing said second portion of said first data word and accessible by said first set of address bits being received at said first set of address inputs and said second set of address bits being received at said second set of address inputs, and a second storage location for storing said first portion of said second data word, and accessible by said first set of address bits being received at said first set of address inputs and said third set of address bits being received at said second set of address inputs; and
    control circuitry:
        accessing in a first mode a selected one of said first and second data words by providing said first set of address bits to said first set of address inputs associated with each of said first and second memories and a corresponding one of said second and third sets of bits to said second set of address inputs associated with each of said first and second memories; and
        accessing in a second mode a selected one of said first and second portions of both said first and second data words by providing said first set of address bits to said first set of address inputs associated with each of said first and second memories, providing a selected one of said second and third sets of bits to said second set of address inputs associated with said first memory and providing an other one of said second and third sets of bits to said second set of address inputs associated with said second memory.

2. The processing system of claim 1 and further comprising a second memory bank including:
    third memory, first and second sets of address inputs associated with said third memory, including a first storage location for storing said first portion of a third data word and accessible by first set of address bits being received at said first set of address inputs associated with said third memory and a fourth set of address bits being received at said second set of address inputs associated with said third memory, and a second storage location for storing said second portion of a fourth data word and accessible by said first set of address bits being received at said first set of address inputs associated with said third memory and a fifth set of address bits being received at said second set of address inputs associated with said third memory; and
    fourth memory, first and second sets of address inputs associated with said fourth memory, including a first storage location for storing said second portion of said third data word, and accessible by said first set of address bits being received at said first set of address inputs associated with said fourth memory and said fourth set of address bits being received at said second set of address inputs associated with said fourth memory, and a second storage location for storing said first portion of said fourth data word and accessible by said first set of address bits being received at said first set of address inputs associated with said fourth memory and said fifth set of address bits being received at said second set of address inputs associated with said fourth memory; and
    wherein said control circuitry:
        further accessing in said first mode a selected one of said third and fourth data words by providing said first set of address bits to said first set of address inputs associated with each of said third and fourth memories and a corresponding one of said fourth and fifth sets of bits to said second set of address inputs associated with said first and second memories; and
        further accessing in said second mode a selected one of said first and second portions of both said third and fourth data words by providing said first set of address bits to said first set of address inputs associated with each of said third and fourth memories, providing a selected one of said second and third sets of bits to said second set of address inputs associated with said third memory and providing another one of said second and third sets of bits to said second set of address inputs associated with said fourth memory.

3. The processing system of claim 2 wherein said control circuitry selectively accesses data from either said first memory bank or said second memory bank at one time.

4. The processing system of claim 2 wherein said control circuitry selectively simultaneously accesses data from selected ones of said first, second, third or fourth memories of both of said first memory bank and of said second memory bank.

5. The processing system of claim 2 wherein each of said first, second, third and fourth memories includes at least one column address strobe input, said control circuitry presenting control signals to said column address strobe inputs to select between said selected first and second portions accessed from each said first and second memory banks in said second mode.

6. The processing system of claim 2 wherein each of said first, second, third and fourth memories includes at least one column address strobe input, said control circuitry presenting control signals to said column address strobe inputs to select between said selected words accessed in said first mode.

7. The processing system of claim 1 wherein said first and second portions comprise multiple bit words and said first and second storage locations each include a plurality of bit storage cells.

8. The processing system of claim 7 wherein said plurality of bit storage cells of each of said first and second storage locations are distributed across a plurality of bit planes.

9. The processing system of claim 8 wherein said first, second, third and fourth memories comprise video random access memories.

10. The processing system of claim 1 wherein said control circuitry provides a said first set of address bits to said first set of address inputs associated with said first and second memories and at least some bits of said second and third sets of address bits to said second set of address inputs associated with said first and second memories via an address bus.

11. A processing system operating on pixels having red, green, blue and alpha gun portions comprising:
a first memory bank comprising:
a first memory including a first storage location for storing said red gun portion of a first pixel and accessible by a set of primary address bits and a first set of least significant address bits, a second storage location for storing said green gun portion of a second pixel and accessible by said primary address bits and a second set of least significant address bits, a third storage location for storing said blue gun portion of a third pixel and accessible by said primary address bits and a third set of least significant address bits, and a fourth storage location for storing said alpha gun portion of a fourth pixel and accessible by said primary address bits and a fourth set of least significant bits;
a second memory including a first storage location for storing said alpha gun portion of said first pixel and accessible by said primary address bits and said first set of least significant address bits, a second storage location for storing said red gun portion of said second pixel and accessible by said primary address bits and said second set of least significant address bits, a third storage location for storing said green gun portion of said third pixel and accessible by said primary address bits and said third set of least significant address bits, and a fourth storage location for storing said blue gun portion of said fourth pixel and accessible by said primary address bits and a fourth set of least significant address bits;
a third memory including a first storage location for storing said blue gun portion of said first pixel and accessible by said primary address bits and said first set of least significant address bits, a second storage location for storing said alpha gun portion of said second pixel and accessible by said primary address bits and said second set of least significant address bits, a third storage location for storing said red gun portion of said third pixel and accessible by said primary address bits and said third set of least significant bits, and a fourth storage location for storing said green gun portion of said fourth pixel and accessible by said primary address bits and a fourth set of least significant address bits;
a fourth memory including a first storage location for storing said green gun portion of said first pixel and accessible by said primary address bits and said first set of least significant address bits, a second storage location for storing said blue gun portion of said second pixel and accessible by said primary address bits and said second set of least significant address bits, a third storage location for storing said alpha gun portion of said third pixel and accessible by said primary address bits and said third set of least significant bits, and a fourth storage location for storing said red gun portion of said fourth pixel and accessible by said primary address bits and a fourth set of least significant bits; and
a processor:
accessing in a first mode a selected one of said first, second, third and fourth pixels by presenting each of said first, second, third and fourth memories with said primary address bits and a selected one of said sets of said least significant address bits; and
accessing in a second mode a selected gun portion from each of said pixels by presenting said primary address bits and a selected one of said sets of least significant address bits to said first memory to access a corresponding location for storing said selected gun portion and providing corresponding sets of least significant address bits to said second, third and fourth memories by permuting said set of least significant address bits presented to said first memory.

12. The processing system of claim 11 wherein each of said first, second, third and fourth memories includes column address strobe inputs, said processor presenting control signals to said column address strobe inputs to select between said gun portions accessed from each of said first, second, third and fourth memories in said second mode.

13. The processing system of claim 11 wherein each of said pixels is composed of gun portions having an equal number of bits.

14. The processing system of claim 11 wherein said processor accesses data via a data bus coupled to a data port of said processor and to each of said storage locations of said first, second, third and fourth memories.

15. The processing system of claim 14 wherein said processor provides at least some of said least significant address bits to said first, second, third and fourth memories via an address bus.

16. The processing system of claim 11 wherein said first, second, third and fourth memories comprise video random access memories.

17. A processing system according to claim 11 and further comprising:
a second memory bank for storing fifth, sixth, seventh and eighth pixels including:
a first memory including a first storage location for storing said red gun portion of said seventh pixel and accessible by a set of primary address bits and a fifth set of least significant address bits, a second storage location for storing said green gun portion of said eighth pixel and accessible by said primary address bits and a sixth set of least significant address bits, a third storage location for storing said blue gun portion of said fifth pixel and accessible by said primary address bits and a seventh set of least significant address bits, and a fourth storage location for storing said alpha gun portion of said sixth pixel and accessible by said primary address bits and an eighth set of least significant bits;
a second memory including a first storage location for storing said alpha gun portion of said seventh pixel and accessible by said primary address bits and said fifth set of least significant address bits, a second storage location for storing said red gun portion of said eighth pixel and accessible by said primary address bits and said sixth set of least significant address bits, a third storage location for storing said green gun portion of said fifth pixel and accessible by said primary address bits and said seventh set of least significant address bits, and a fourth storage location for storing said blue gun portion of said sixth pixel and accessible by said primary address bits and an eighth set of least significant address bits;
a third memory including a first storage location for storing said blue gun portion of said seventh pixel and accessible by said primary address bits and said fifth set of least significant address bits, a second storage location for storing said alpha gun portion of said eighth pixel and accessible by said primary address bits and said sixth set of least significant address bits, a third storage location for storing said red gun portion of said fifth pixel and accessible by said primary address bits and said seventh set of least significant address bits, and a fourth storage location for storing said green gun portion of said sixth pixel and accessible by said primary address bits and an eighth set of least significant address bits;
a fourth memory including a first storage location for storing said green gun portion of said seventh pixel and accessible by said primary address bits and said fifth set of least significant address bits, a second storage location for storing said blue gun portion of said eighth pixel and accessible by said primary address bits and said sixth set of least significant address bits, a third storage location for storing said alpha gun portion of said fifth pixel and accessible by said primary address bits and said seventh set of least significant bits, and a fourth storage location for storing said red gun portion of said sixth pixel and accessible by said primary address bits and an eighth set of least significant bits; and
a control circuitry:
further accessing in said first mode a selected one of said gun portions of each of said pixels by presenting each of said first, second, third and fourth memories with said primary address bits and a selected one of said sets of said least significant address bits; and
further accessing in said second mode a selected pixel by presenting said primary address bits and a selected one of said sets of least significant address bits to said first memory to access a corresponding location for storing said portions of said selected pixels and providing corresponding sets of least significant address bits to said second, third and fourth memories by permuting said set of least significant address bits presented to said first memory.

18. The processing system of claim 17 wherein said fifth set of least significant address bits equals said first set of least significant address bits, said sixth set of least significant address bits equals said second set of least significant address bits, said seventh set of least significant address bits equals said third set of least significant address bits and said eighth set of least significant address bits equals said fourth set of least significant address bits.

19. A processing system operating on data words each having first, second, third and fourth portions comprising:
a memory bank comprising:
a first section of memory including a first storage location for storing said first portions of first and second data words and accessible by a first set of least significant address bits, a second storage location for storing said second portions of third and fourth data words and accessible by a second set of least significant address bits, a third storage location for storing said third portions of fifth and sixth data words and accessible by a third set of least significant bits, and a fourth storage location for storing said fourth portions of seventh and eighth data words and accessible by a fourth set of least significant bits;
a second section of memory including a first storage location for storing said fourth portions of said first and second data words and accessible by said first set of least significant address bits, a second storage location for storing said first portion of said third and fourth data words and accessible by said second set of least significant address bits, a third storage location for storing said second portion of said fifth and sixth data words, said third location accessible by said third set of least significant bits, and a fourth storage location for storing said third portion of said seventh and eighth data words and accessible by said fourth set of least significant bits;
a third section of memory including a first storage location for storing said third portion of said first and second data words and accessible by said first set of least significant address bits, a second storage location for storing said fourth portion of said third and fourth data words and accessible by said second set of least significant address bits, a third storage location for storing said first portion of said fifth and sixth data words and accessible by said third set of least significant bits, and a fourth storage location for storing said second portion of said seventh and eighth data words and accessible by said fourth set of least significant bits;

a fourth section of memory including a first storage location for storing said second portion of said first and second data words and accessible by said first set of least significant address bits, a second storage location for storing said third portion of said third and fourth data words and accessible by said second set of least significant address bits, a third storage location for storing said fourth portion of said fifth and sixth data words and accessible by said third set of least significant bits, and a fourth storage location for storing said first portion of said seventh and eighth data words and accessible by said fourth set of least significant bits; and a control circuitry:

accessing in a first mode a selected pair of data words by presenting each of said first, second, third and fourth memories with a corresponding one of said first, second, third and fourth sets of said least significant address bits; and accessing in a second mode a selected portion from each of said data words by presenting a selected one of said first, second, third and fourth sets of least significant address bits to said first memory to access a corresponding location for storing said selected portion and providing corresponding sets of least significant address bits to said second, third and fourth memories by permuting said first set of least significant address bits presented to said first memory.

20. The processing system of claim 19 wherein said first, second, third and fourth sets of least significant address bits each comprise two bits and said first, second, third and fourth sets of least significant address bits comprise permutations of each other.

21. The processing system of claim 19 wherein each of said first, second, third and fourth sections of memories is associated with a plurality of column address strobe inputs, said processor presenting column address strobe signals to said column address strobe inputs to select between said pairs of words being accessed in said first mode.

22. The processing system of claim 19 wherein each of said first and second storage locations includes first and second sets of bit storage locations, said first sets of storage locations for storing respective portions of said first, third, fifth and seventh data words and said second sets of storage locations for storing respective portions of said second, fourth, sixth and eight data words.

23. The processing system of claim 19 wherein each said location includes first and second sets of bit storage locations, said first sets of storage locations for storing respective portions of second, fourth, sixth and eighth data words and said second sets of storage locations for storing respective portions of said first, third, fifth and seventh words.

24. A method of providing access to data in a processing system operating on data words each having at least first and second ordered portions comprising the steps of:

storing said first ordered portion of a first data word in a first location of a first section of memory accessible by a set of most significant address bits and a first set of least significant address bits;

storing said second ordered portion of the first word in a first location of a second section of memory accessible by the set of most significant address bits and the first set of least significant address bits;

storing said first ordered portion of a second word in a second location of the first section of memory accessible by the set of most significant address bits and the second set of least significant address bits;

storing said second ordered portion of the second word in a second location of the second section of memory accessible by the set of most significant address bits and the second set of least significant address;

in a first mode, accessing a selected one of said first and second words by providing the set of most significant address bits to each of the first and second sections of memory and a corresponding one of the first and second sets of bits least significant address bits to both the first and second sections of memory; and in a second mode, accessing a selected one the first and second portions from both of the first and second words by providing the set of most significant address bits to each of the first and second sections of memory and providing a selected one of the first and second sets of least significant address bits to the first section of memory and providing an other one of the first and second sets of least significant address bits to the second section of memory.

25. The method of claim 24 and further comprising the step of selecting between said first and second portions of the first and second words accessed in the second mode using column address strobe signals associated with each of the first and second sections of memory.

26. The method of claim 24 and further comprising the steps of:

storing the first portion of a third word in a first location of a third section of memory accessible by the set of most significant address bits and a third set of least significant address bits;

storing the second portion of the third word in a first location of a fourth section of memory accessible by the set of most significant address bits and a third set of least significant address bits;

storing the first portion of a fourth word in a second location of third section of memory accessible by the set of most significant bits and a fourth set of least significant address bits;

storing the second portion of the fourth word in a second location of the fourth section of memory accessible by the set of most significant address bits and the fourth set of least significant address;

in the first mode, accessing a selected one of the third and fourth words by providing the set of most significant address bits to each of the third and fourth sections of memory and a corresponding one of the third and fourth sets of least significant address bits to both the third and fourth sections of memory; and in the second mode, accessing a selected one of the first and second portions from both of the third and fourth words by providing the set of most significant address bits to each of the third and fourth sections of memory and providing a selected one of the first and second sets of least significant bits to the third section of memory and providing an other one of the first and second sets of least significant address bits to the fourth section of memory.

27. The method of claim 26 and further comprising the step of selecting between the portions of the first and second words accessed in the first mode using column address strobe signals associated with each of the first, second, third and fourth sets of memory.

28. The processing system of claim 1 wherein:
said first memory bank includes a first memory multibit data port for data input and output;
said processing system further comprises a data exchanger having a first multibit data port connected to said first memory multibit data port of said first memory bank and a second multibit data port, said data exchanger connecting individual bits of said first multibit data port to individual bits of said second multibit data port in a first order when said control circuitry is in said first mode and in a second order different from said first order when said control circuitry is in said second mode.

29. The processing system of claim 28 wherein:
said first and second portions of said first data word and said first and second portions of said second data word each consist of a predetermined number of bits; and
said first order of said data exchanger differs from said second order of said data exchanger by permutation of groups of said predetermined number of bits.

30. The processing system of claim 2 wherein:
said first memory bank includes a first memory multibit data port for data input and output;
said second memory bank includes a second memory multibit data port for data input and output;
said processing system further comprises a data exchanger having a first multibit data port and a second multibit data port, each individual bit of said first multibit data port connected to an individual bit of said first memory multibit data port of said first memory bank and to a corresponding individual bit of said second memory multibit data port of said second memory bank in a wired OR, said data exchanger connecting individual bits of said first multibit data port to individual bits of said second multibit data port in a first order when said control circuitry is in said first mode and in a second order different from said first order when said control circuitry is in said second mode.

31. The processing system of claim 30 wherein:
said first and second portions of said first data word and said first and second portions of said second data word each consist of a predetermined number of bits; and
said first order of said data exchanger differs from said second order of said data exchanger by permutation of groups of said predetermined number of bits.

32. The processing system of claim 11 wherein:
said first memory bank includes a first memory multibit data port for data input and output;
said processing system further comprises a data exchanger having a first multibit data port connected to said first memory multibit data port of said first memory bank and a second multibit data port, said data exchanger connecting individual bits of said first multibit data port to individual bits of said second multibit data port in a first order when said control circuitry is in said first mode and in a second order different from said first order when said control circuitry is in said second mode.

33. The processing system of claim 32 wherein:
said red, green, blue and alpha gun portions each consist of a predetermined number of bits; and
said first order of said data exchanger differs from said second order of said data exchanger by permutation of groups of said predetermined number of bits.

34. The processing system of claim 17 wherein:
said first memory bank includes a first memory multibit data port for data input and output;
said second memory bank includes a second memory multibit data port for data input and output;
said processing system further comprises a data exchanger having a first multibit data port and a second multibit data port, each individual bit of said first multibit data port connected to an individual bit of said first memory multibit data port of said first memory bank and to a corresponding individual bit of said second memory multibit data port of said second memory bank in a wired OR, said data exchanger connecting individual bits of said first multibit data port to individual bits of said second multibit data port in a first order when said control circuitry is in said first mode and in a second order different from said first order when said control circuitry is in said second mode.

35. The processing system of claim 34 wherein:
said red, green, blue and alpha gun each consist of a predetermined number of bits; and
said first order of said data exchanger differs from said second order of said data exchanger by permutation of groups of said predetermined number of bits.

36. The processing system of claim 19 wherein:
said memory bank includes a memory multibit data port for data input and output;
said processing system further comprises a data exchanger having a first multibit data port connected to said memory multibit data port of said memory bank and a second multibit data port, said data exchanger connecting individual bits of said first multibit data port to individual bits of said second multibit data port in a first order when said control circuitry is in said first mode and in a second order different from said first order when said control circuitry is in said second mode.

37. The processing system of claim 36 wherein:
said first and second portions of said first data word and said first and second portions of said second data word each consist of a predetermined number of bits; and
said first order of said data exchanger differs from said second order of said data exchanger by permutation of groups of said predetermined number of bits.

38. The method of claim 24 further comprising the steps of:
accessing individual data bits in said first and second sections of memory in a first order when in said first mode; and accessing individual data bits in said first and second sections of memory in a second order different from said first order when in said second mode.

39. The method of claim 38 wherein:
said first and second order portions of said first and second data words consist of a predetermined number of bits; and
said first order differs from said second order by permutation of groups of said predetermined number of bits.

* * * * *